United States Patent
Eldessoki et al.

(10) Patent No.: US 11,659,525 B2
(45) Date of Patent: May 23, 2023

(54) COMMUNICATING DATA OF A FIRST USER EQUIPMENT AND DATA OF A SECOND USER EQUIPMENT ON SHARED RESOURCES OF A WIRELESS COMMUNICATION SYSTEM

(71) Applicants: Fraunhofer-Gesellschaft zur Förderung der angewandten Forschung e.V., Munich (DE); ETRI—Electronics and Telecommunications Research Institute, Daejeon (KR)

(72) Inventors: Sameh Eldessoki, Berlin (DE); Johannes Dommel, Berlin (DE); Saeed Afrasiabi Gorgani, Berlin (DE); Wooram Shin, Berlin (DE); Thomas Haustein, Potsdam (DE); Lars Thiele, Berlin (DE); Young-Jo Ko, Daejeon (KR); SeungKwon Baek, Daejeon (KR)

(73) Assignees: Fraunhofer-Gesellschaft zur Förderung der angewandten Forschung e.V., Munich (DE); ETRI—Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 16/994,252

(22) Filed: Aug. 14, 2020

(65) Prior Publication Data

US 2021/0007095 A1    Jan. 7, 2021

Related U.S. Application Data

(63) Continuation of application No. PCT/EP2019/053430, filed on Feb. 12, 2019.

(30) Foreign Application Priority Data

Feb. 15, 2018  (EP) ..................................... 18157032

(51) Int. Cl.
*H04W 72/04* (2009.01)
*H04W 72/12* (2009.01)
(Continued)

(52) U.S. Cl.
CPC ......... *H04W 72/044* (2013.01); *H04L 5/0048* (2013.01); *H04W 72/51* (2023.01); *H04W 72/542* (2023.01)

(58) Field of Classification Search
None
See application file for complete search history.

(56) References Cited

U.S. PATENT DOCUMENTS

| | | | | | |
|---|---|---|---|---|---|
| 5,533,013 | A | * | 7/1996 | Leppanen ............ | H04J 13/0011 370/347 |
| 6,782,255 | B1 | * | 8/2004 | Ranta ..................... | H04B 7/005 370/335 |

(Continued)

FOREIGN PATENT DOCUMENTS

CN    106452664 A    2/2017

OTHER PUBLICATIONS

3. Kim _ [LTE] SRS_May 2013, http://brucekim.egloos.com/3417489, retrieved from the Internet Oct. 14, 2020, Oct. 14, 2020.

(Continued)

*Primary Examiner* — Sai Aung
(74) *Attorney, Agent, or Firm* — Perkins Coie LLP; Michael A. Glenn

(57) ABSTRACT

An apparatus serves a plurality of user equipments in a wireless communication system. For transmitting/receiving data of a plurality of user equipments, which include at least a first user equipment and a second user equipment, on resources shared by the plurality of user equipments, the apparatus transmits/receives a first data signal of the first user equipment and second data signal of the second user (Continued)

equipment using a non-orthogonal multiple access, NOMA, scheme. The first data signal and the second data signal are modulated using different waveforms prior to superposition of the first and second data signals.

14 Claims, 10 Drawing Sheets

(51) Int. Cl.
*H04W 72/044* (2023.01)
*H04L 5/00* (2006.01)
*H04W 72/51* (2023.01)
*H04W 72/542* (2023.01)

(56) References Cited

U.S. PATENT DOCUMENTS

| | | | | |
|---|---|---|---|---|
| 6,788,661 | B1* | 9/2004 | Ylitalo | H04W 52/42 370/320 |
| 7,555,266 | B2* | 6/2009 | Haardt | H04B 7/0615 455/114.2 |
| 9,485,773 | B2* | 11/2016 | Bhattad | H04W 72/082 |
| 2016/0100414 | A1 | 4/2016 | Guvenkaya et al. | |
| 2017/0257184 | A1* | 9/2017 | Stirling-Gallacher | H04W 52/24 |
| 2020/0084735 | A1* | 3/2020 | Cheng | H04W 52/34 |

OTHER PUBLICATIONS

LTE RSSI, RSRP and RSRQ Measurement—CableFree, URLhttp://www.cablefree.net/wirelesstechnology/4glte/rsrp-rsrq-measurement-lte/, retrieved from internet Oct. 14, 2020, Oct. 14, 2020.

3GPP TSG RAN WG1 #84b, Qualcomm Inc., R1-163510, Candidate NR Multiple Access Schemes, Apr. 2016, Apr. 2016.
3GPP TSG RAN WG1 Meeting #84bis, R1-162155, Huawei et al., SCMA for 5G Radio Transmission, Apr. 2016, Apr. 2016.
3GPP TSG RAN WG1 Meeting #84bis, R1-162226, Discussion on multiple access for new radio interface, Apr. 2016, Apr. 2016.
3GPP TSG RAN WG1 Meeting #84bis, R1-162385, Intel Corporation, Multiple access schemes for new radio interface, Apr. 2016, Apr. 2016.
3GPP TSG RAN WG1 Meeting #84bis, R1-162517, LG Electronics-Considerations on DL/UL multiple access for NR, Apr. 2016, Apr. 2016.
3GPP TSG RAN WG1 Meeting #84bis, R1-163111, NTT DOCOMO Inc., Initial views and evaluation results on non-orthogonal multiple access for NR uplink, Apr. 2016, Apr. 2016.
3GPP TSG RAN WG1 Meeting #84bis, R1-163383-CATT, Candidate Solution for New Multiple Access, Apr. 2016, Apr. 2016.
3GPP TSG RAN WG1 Meeting #86, R1-166653, Sony, Consideration on synchronization for NR, Aug. 2016, Aug. 2016.
3GPP TR 36.859 v13.0.0, Dec. 2015, Study on Downlink Multiuser Superposition Transmission (MUST) for LTE (Release 13), Dec. 2015.
K.S. Pasupuleti, How LTE Stuff Works? : Sounding Reference Signal Procedure, Jul. 2014, URL: http://nowltestuffworks.blogspot.de/2014/07/sounding-reference-signal-procedure.html, Jul. 2014.
3GPP TSG RAN WG1 Meeting #85, R1-163992, Samsung, Non-orthogonal Multiple access candidate for NR, May 2016, May 2016.
3GPP TSG-RAN WG1 #85, R1-165020, Nokia et al, Contention-based non-orthogonal multiple access with frequency hopping for mMTC uplink, May 2016, May 2016.
3GPP TSG-RAN WG1 #85, R1-165021, Nokia et al, Performance of Interleave Division Multiple Access (IDMA) in Combination with OFDM Family Waveforms, May 2016, May 2016.
3GPP TSG-RAN WG1 85, R1-165019, Nokia et al, Non-orthogonal multiple access for New Radio, May 2016, May 2016.

* cited by examiner

US 11,659,525 B2

COMMUNICATING DATA OF A FIRST USER EQUIPMENT AND DATA OF A SECOND USER EQUIPMENT ON SHARED RESOURCES OF A WIRELESS COMMUNICATION SYSTEM

CROSS-REFERENCES TO RELATED APPLICATIONS

This application is a continuation of copending International Application No. PCT/EP2019/053430, filed Feb. 12, 2019, which is incorporated herein by reference in its entirety, and additionally claims priority from European Application No. EP 18 157 032.6, filed Feb. 15, 2018, which is incorporated herein by reference in its entirety.

BACKGROUND OF THE INVENTION

The present application concerns the field of wireless communications, more specifically the transmission and reception of data of a plurality of users or user equipments, UEs, on shared resources using a non-orthogonal multiple access, NOMA, transmission or reception scheme. Embodiments relate to an overlay-waveform optimization for the NOMA transmission scheme using independent waveforms optimized for the channel characteristics of each UE. Other embodiments relate a user grouping in a NOMA transmission scheme that depends on the mobility of the UEs to reduce the information that needs to be signaled.

FIG. 1 is a schematic representation of an example of a wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, is referred to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may be diversified in order to provide various types of communication services such as voice or data services. In general, the wireless communication system may be a multiple access system capable of sharing available system resources, e.g., bandwidth, transmission power or the like, to support the communication with multiple users. Examples of the multiple access system include a Code Division Multiple Access, CDMA, system, a Frequency Division Multiple Access, FDMA, system, a Time Division Multiple Access, TDMA, system, an Orthogonal Frequency Division Multiple Access, OFDMA, system, a Single Carrier Frequency Division Multiple Access, SC-FDMA, system, and the like. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referred to as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station $MeNB_1$ as indicated by arrow $124_1$ and by the small cell base station $SeNB_1$, as indicated schematically by the arrow $124_2$.

In mobile communication systems or networks, for example, in those networks described above with reference to FIG. 1 and FIG. 2, like a LTE or a 5G/NR network, technologies for sharing available system resources, e.g., bandwidth, transmission power or the like, to support a communication with multiple users or user equipments include non-orthogonal multiple access, NOMA, schemes, for example, the downlink multi-user shared access, DL-MUST, scheme that is described, for example, in reference [1].

FIG. 3 is a block diagram illustrating the principle of the multi-user superposition transmission, MUST, scheme in accordance with reference [1]. The MUST scheme exploits the near-far effect and applies a power allocation for the user separation. For example, users which are close to a transmitter may be attributed with less power in the downlink when compared to users further away. The distance of a user to the transmitter may be determined by the actual geographical location of the user relative to the transmitter, or the distance may be determined in terms of path-loss or signal attenuation on a channel between the user and the transmitter. The near user data $200_N$ for the near user and the far user data $200_F$ for the far user are independently processed, more specifically the near user data $200_N$ and the far user data $200_F$ are independently encoded using a near user constellation $202_N$ and a far user constellation $202_F$. The encoded near user data signal $204_N$ and the encoded far user data signal $204_F$ are applied to respective power allocation circuits $206_N$, $206_F$ have allocated thereto respective power levels. The power level allocated to the encoded far user data signal $204_F$ is higher than the power level allocated to the encoded near user data signal $204_N$. The near user data signal $208_N$ as processed by the power allocation circuit $206_N$ and the far user data signal $208_F$ as processed by the power allocation circuit $206_F$ are applied to a superposition circuit 210 superimposing the signals $208_N$ and $208_F$ thereby obtaining the superimposed signal 212 including the encoded first data signal of the near user and the encoded second data signal of the far user. The superimposed signal 212 is modulated in accordance with a predefined waveform 214 so as to obtain the final signal 216 that is transmitted via the radio link to the near user and to the far user. At the receiver side, the near user decodes and subtracts first the signal from the far user, which, as mentioned above, has the higher power signal when compared to the near user. The decoding and subtracting of the first signal from the far user is done prior to the decoding of the signal of the near UE. The far user decodes the superimposed signal, and the signal meant for the other user which is closer to the transmitter may be considered as an additional noise term or as a low level interference.

When considering, as an example, a situation in which data signals of two users are to be transmitted using the MUST scheme, both elementary or data signals share the same waveform for the modulation. The waveform needs to be selected or optimized for the user having the worst channel. This may be not an optimum selection for a user having a better channel. Selecting the waveform dependent on the worst user's channel may include providing an adaptive cyclic prefix, CP, for an OFDM transmission for compensating large delay spreads. In addition, the user grouping in terms of far user and near user is only based on the relative location, either determined by the path-loss/signal attenuation or by the actual geographical location, but it does not take into consideration other UE characteristics.

It is noted that the information in the above section is only for enhancing the understanding of the background of the invention and therefore it may contain information that does not form the conventional technology that is already known to a person of ordinary skill in the art.

SUMMARY

An embodiment may have an apparatus for serving a plurality of user equipments in a wireless communication system, wherein, for transmitting data of a plurality of user equipments, which include at least a first user equipment and a second user equipment, on resources shared by the plurality of user equipments, the apparatus is configured to transmit a first data signal of the first user equipment and second data signal of the second user equipment using a non-orthogonal multiple access, NOMA, scheme, and wherein the first data signal and the second data signal are modulated using different waveforms prior to superposition of the first and second data signals.

Another embodiment may have an apparatus for serving a plurality of user equipments in a wireless communication system, wherein, for transmitting data of a plurality of user equipments, which include at least a first user equipment and a second user equipment, on resources shared by the of plurality of user equipments, the apparatus is configured to modulate the first data signal and the second data signal using different waveforms prior to superimposing the first and second data signals, process the first data signal and the second data signal according to a pathloss or signal attenuation on a channel between the first and second user equipments and the apparatus or according to the geographical locations of the first user equipment and the second user equipment relative to the apparatus, and superimpose the first data signal and the second data signal.

Another embodiment may have an apparatus for serving a plurality of user equipments in a wireless communication system, wherein the apparatus is configured to receive on resources, which are shared by a plurality of user equipments, which include at least a first user equipment and a second user equipment, a superimposed signal having at least a first data signal of the first user equipment and a second data signal of the second user equipment, the first data signal and the second data signal modulated using different waveforms and processed according to a non-orthogonal multiple access, NOMA, scheme, wherein the apparatus is configured to process the received superimposed signal to acquire the first data signal and the second data signal, and wherein the apparatus is configured to demodulate the first data signal and the second data signal on the basis of the waveforms used for modulating the first data signal and the second data signals.

Another embodiment may have an apparatus for serving a plurality of user equipments in a wireless communication system, wherein, for transmitting data of a plurality of user equipments, which include at least a first user equipment and a second user equipment, on resources shared by the plurality of user equipments, the apparatus is configured to process the first data signal and the second data signal according to a pathloss or signal attenuation on a channel between the first and second user equipments and the apparatus or according to the geographical locations of the first user equipment and the second user equipment relative to the apparatus, superimpose the first data signal and the second data signal, and modulate the superimposed signal using a certain waveform, wherein the first data signal and the second data signal are further processed according to a mobility of the first user equipment and the second user equipment.

Another embodiment may have a user equipment served by an apparatus in a wireless communication system, wherein, to receive data from the apparatus on resources shared by the user equipment and at least one further user equipment, the user equipment is configured to receive a superimposed signal having a first data signal of the user equipment and a second data signal of the further user equipment, wherein the first data signal is modulated using a first waveform, and the second data signal is modulated using a second waveform, the first waveform being different from the second waveform.

Another embodiment may have a wireless communication system, having: one or more apparatuses according to the invention, and a plurality of user equipments according to the invention.

Another embodiment may have a method for transmitting in a wireless communication system data of a plurality of user equipments, which include at least a first user equipment and a second user equipment, on resources shared by the plurality of user equipments, the method having the steps of: transmitting a first data signal of the first user equipment and second data signal of the second user equipment using a non-orthogonal multiple access, NOMA, scheme, wherein the first data signal and the second data signal are modulated using different waveforms prior to superposition of the first and second data signals.

Another embodiment may have a method for transmitting in a wireless communication system data of a plurality of user equipments, which include at least a first user equipment and a second user equipment, on resources shared by the plurality of user equipments, the method having the steps of: modulating the first data signal and the second data signal using different waveforms prior to superimposing the first and second data signals, processing the modulated first data signal and the modulated second data signal according to a pathloss or signal attenuation on a channel between the first and second user equipments and the apparatus or according to the geographical locations of the first user equipment and the second user equipment relative to the apparatus, and superimposing the first data signal and the second data signal.

Another embodiment may have a method for transmitting in a wireless communication system data of a plurality of user equipments, which include at least a first user equipment and a second user equipment, on resources shared by the plurality of user equipments, the method having the steps of: processing the first data signal and the second data signal according to a pathloss or signal attenuation on a channel between the first and second user equipments and the apparatus or according to the geographical locations of the first user equipment and the second user equipment relative to the apparatus, superimposing the first data signal and the second data signal, and modulating the superimposed signal using a certain waveform, wherein the first data signal and the second data signal are further processed according to a mobility of the first user equipment and the second user equipment.

Another embodiment may have a method for receiving in a wireless communication system data of a plurality of user equipments, which include at least a first user equipment and data of a second user equipment, on resources shared by the plurality of user equipments, the method having the steps of: receiving on resources, which are shared by the plurality of user equipments, a superimposed signal having at least a first data signal of the first user equipment and a second data signal of the second user equipment, the first data signal and the second data signal modulated using different waveforms and processed according to a non-orthogonal multiple access, NOMA, scheme, processing the received superimposed signal to acquire the first data signal and the second data signal, and demodulating the first data signal and the second data signal on the basis of the waveforms used for modulating the first data signal and the second data signals.

Another embodiment may have a method for receiving in a wireless communication system data of a first user equipment on resources shared by the first user equipment and a second user equipment, the method having the steps of: receiving a superimposed signal having a first data signal of the first user equipment and a second data signal of the second user equipment, cancelling the second data signal from the superimposed signal, decoding the data from the first data signal, wherein the first data signal is modulated using a first waveform, and the second data signal is modulated using a second waveform, the first waveform being different from the second waveform.

Another embodiment may have a non-transitory digital storage medium having a computer program stored thereon to perform the methods according to the invention when said computer program is run by a computer

BRIEF DESCRIPTION OF THE DRAWINGS

Embodiments of the present invention will be detailed subsequently referring to the appended drawings, in which.

DETAILED DESCRIPTION OF THE INVENTION

Figure 1:
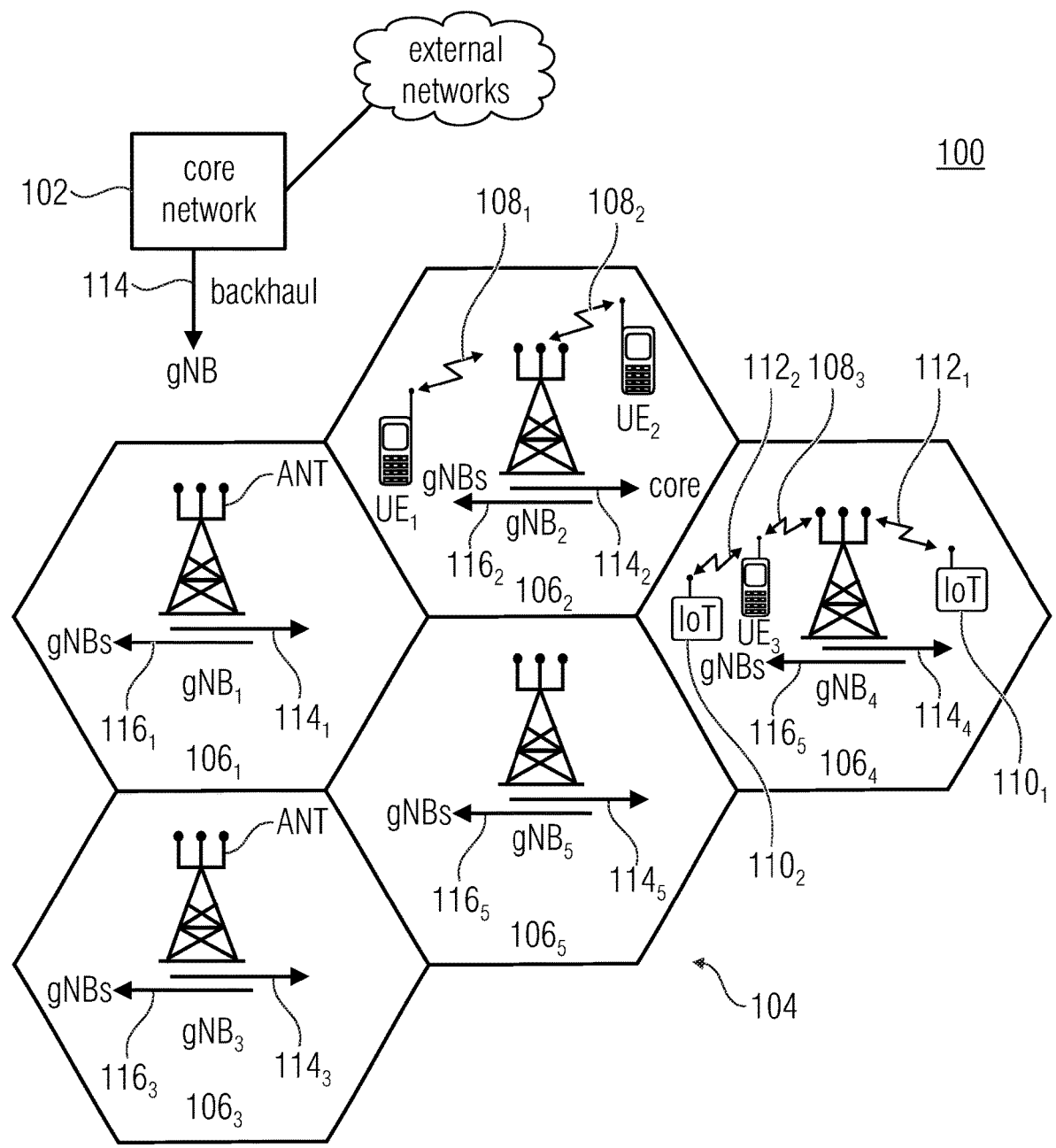
FIG. 1 shows a schematic representation of an example of a wireless communication system.

Embodiments of the present invention are now described in more detail with reference to the accompanying drawings in which the same or similar elements have the same reference signs assigned.

To address the problems and drawbacks discussed above with reference to conventional transmission schemes using superimposed signals, like the MUST scheme explained with reference to FIG. 3, the inventive approach suggests different aspects addressing the drawbacks associated with the use of a single waveform and associated with the limitation of the user characterization only on the basis of their location relative to the transmitter. In accordance with a first aspect, the present invention teaches the use of independent waveforms which are selected or optimized for the channel characteristics of the respective UE. In accordance with a second aspect, users are not only grouped dependent on their location relative to the transmitter but also dependent on their mobility so as to reduce the information that needs to be signaled.

First Aspect

The present invention provides an apparatus for serving a plurality of user equipments in a wireless communication system,
 wherein, for transmitting data of a plurality of user equipments, which include at least a first user equipment and a second user equipment, on resources shared by the plurality of user equipments, the apparatus is configured to transmit a first data signal of the first user equipment and second data signal of the second user equipment using a non-orthogonal multiple access, NOMA, scheme, and
 wherein the first data signal and the second data signal are modulated using different waveforms prior to superposition of the first and second data signals.

The present invention provides a method for transmitting in a wireless communication system data of a plurality of user equipments, which include at least a first user equipment and a second user equipment, on resources shared by the plurality of user equipments, the method comprising:
 transmitting a first data signal of the first user equipment and second data signal of the second user equipment using a non-orthogonal multiple access, NOMA, scheme,
 wherein the first data signal and the second data signal are modulated using different waveforms prior to superposition of the first and second data signals.

In accordance with embodiments, the first data signal is provided or modulated using a first waveform, and the second data signal is provided or modulated using a second waveform, the first waveform being different from the second waveform.

In accordance with embodiments, instead of processing or modulating the superimposed signal using a common waveform, the first data signal and the second data signal are processed or modulated using the first waveform and the second waveform, respectively. The processing may refer to a transformation of the individual signals from the frequency domain to the time domain, e.g., the symbols on the frequency-time grid may be processed to a specific waveform, WF, like inserting CP and do IFFT in case of CP-OFDM. Generally, this process may consider the sum-signal in the f-domain. The summation may be done in the time domain.

The present invention provides an apparatus for serving a plurality of user equipments in a wireless communication system, wherein, for transmitting data of a plurality of user equipments, which include at least a first user equipment and a second user equipment, on resources shared by the plurality of user equipments, the apparatus is configured to
 modulate the first data signal and the second data signal using different waveforms prior to superimposing the first and second data signals,
 process the first data signal and the second data signal according to a pathloss or signal attenuation on a channel between the first and second user equipments and the apparatus or according to the geographical locations of the first user equipment and the second user equipment relative to the apparatus, and
 superimpose the first data signal and the second data signal.

The present invention provides a method for transmitting in a wireless communication system data of a plurality of user equipments, which include at least a first user equipment and a second user equipment, on resources shared by the plurality of user equipments, the method comprising:
 modulating the first data signal and the second data signal using different waveforms prior to superimposing the first and second data signals,
 processing the modulated first data signal and the modulated second data signal according to a pathloss or signal attenuation on a channel between the first and second user equipments and the apparatus or according to the geographical locations of the first user equipment and the second user equipment relative to the apparatus, and
 superimposing the first data signal and the second data signal.

In accordance with embodiments, for modulating the first data signal and the second data signal, the apparatus is configured to:
 modulate the first data signal of the first user equipment using a first waveform, and modulate the second data signal of the second user equipment using a second waveform, the first waveform being different from the second waveform.

In accordance with embodiments, for processing the first data signal and the second data signal, the apparatus is configured to allocate a first power level to the first data signal and a second power level to the second data signal, the first power level being different from the second power level, and/or apply a first spreading sequence to the first data signal and a second spreading sequence to the second data signal, the first spreading sequence being different from the second spreading sequence.

Thus, in accordance with the first aspect of the present invention, other than in conventional approaches, the data signals or data streams for the respective UEs are modulated using independent waveforms prior to the superpositioning or superimposing of the respective data signals for forming the superimposed signal to be transmitted. Thus, other than in conventional approaches in which the waveform modulation follows the superpositioning of the data signals, in accordance with the inventive approach, the waveform modulation is before the superpositioning of the signals using independent waveforms thereby allowing the use of waveforms for the modulation that are different from each other so that they may be selected dependent on the channel properties of the respective channels between the users and the apparatus. In accordance with the first aspect of the present invention, the superpositioning scheme may be a modified MUST scheme independently modulating the data signals prior to superpositioning the modulated signals. In accordance with other embodiments the superpositioning scheme may be based on any other NOMA scheme, for example a scheme applying different spreading sequences (e.g. SCMA) to the respective data signals rather than different power levels. It is noted that the inventive approach is not limited to the just mentioned schemes to be applied to the first and second data signals, rather other non-orthogonal multi-access schemes may be applied, for example applying different interleaver/scrambling sequences (IDMA) or different power allocation (NOMA). Other techniques are indicated in the following table:

| Schemes | TDoc |
|---|---|
| SCMA Sparse Carrier Multiple Access | R1-162155 |
| RSMA Resource Shared Multiple Access | R1-163510 |
| MUSA Multi User Shared Access | R1- 162226 |
| NOMA Non-orthogonal Multiple Access | R1- 163111 |
| NCMA Non-orthogonal Coded MA | R1- 162517 |
| PDMA | R1- 163383 |
| Frequency spreading based non-orthogonal multiple access | R1- 162385 |
| NOCA | R1- 165019 |
| IDMA | R1- 165021 |
| Frequency hopping based access | R1- 165020 |
| IGMA | R1- 163992 |

In accordance with embodiments, the apparatus is configured to determine a condition of a first channel between the apparatus and the first user equipment, determine a condition of a second channel between the apparatus and the second user equipment, and select the first waveform and the second waveform dependent on the respective channel conditions.

In accordance with embodiments, the first waveform and the second waveform comprise:

an OFDM (Orthogonal Frequency-Division Multiplexing) waveform, a CP-OFDM (cyclic pre-fix based OFDM) waveform with normal CP size, a CP-OFDM (cyclic pre-fix based OFDM) waveform with extended CP size, a DFT-s-OFDM (Discrete Fourier Transform-spread-OFDM) waveform with CP a f-OFDM (Filtered OFDM) waveform, a FBMC (Filter Bank Multi-Carrier) waveform, a GFDM (Generalized Frequency Division Multiplexing) waveform, or an UFMC (Universal Filtered Multi-Carrier) waveform.

Other types of waveform not enumerated above are not precluded to use as the first waveform and the second waveform.

In accordance with embodiments of the inventive approach, the selection of the waveforms to be used for the respective data streams of the UEs may be determined on the basis of the conditions of each of the channels between the apparatus and the respective users. This is advantageous as it allows for selecting a suitable waveform for modulating the data signal dependent on the actual condition of the respective channel. Besides the waveforms mentioned above, other known waveforms or waveforms to be implemented in future implementations of a wireless network may be applied in accordance with the teachings of the present invention.

In accordance with embodiments, the apparatus is configured to determine that the pathloss or signal attenuation on the channel between the first user equipment and the apparatus is less than the pathloss or signal attenuation on the channel between the second user equipment and the apparatus, or the first user equipment is closer to the apparatus than the second user equipment, signal to the first user equipment the waveform used for the modulation or a demodulation of the first data signal and the second waveform used for the modulation or a demodulation of the second data signal, and signal to the second user equipment the second waveform used for the modulation of the second data signal.

The signaling may use one or more messages including configuration information indicating the respective waveforms to be used for modulating/demodulating the respective data signals.

In accordance with embodiments, the user equipments are grouped responsive to the path-loss or the signal attenuation on the channel between the respective user and the apparatus. For example, the apparatus may perform a measurement of the signal-to-interference-plus-noise ratio, SINR, or the signal-to-noise ratio, SNR, which, in some situations, may depend on the actual distance of a user to the apparatus. However, there are also situations in which a user, which is actually closer to the apparatus than another user, has a lower SNR than the other user, for example, due to high reflections or shadings on the path between the user and the apparatus, as it may happen, for example, in urban environments. Dependent on the path-loss or signal attenuation, which is determined for the respective users, the near users and far users are identified and data streams for the identified users are processed in accordance with the inventive approach. In addition, the apparatus may signal to the respective user equipments the configuration information of the waveforms used for the modulation of the respective data signals. The near user or the group of near users are signaled both configuration information of the waveforms, which are used for modulating the signals of the near and far users, and prior to decoding the data of the near user in the first signal, the knowledge about the different waveforms is used for cancelling the second signal from the superimposed signal. The far users or the groups of far users are signaled the configuration information of the waveform, which is used for modulating the signal of the near user, as the signals included in the superimposed signals of the near users are seen at the far users as additional noise or as low level interference. Thus, signaling overhead may be avoided by not transmitting information about the waveform used for modulating the signal of the near user.

In accordance with embodiments, the apparatus is configured to
provide a frame including the superimposed signal,
embed in the frame pilot signals to be used by the first user equipment and the second user equipment for channel estimation and/or synchronization, and
transmit the frame including the superimposed signal and the pilot signals.

In accordance with embodiments of the present invention, the superimposed signal may be provided using a frame including, in addition to the data signals, also pilot signals to be used by the respective UE for channel estimation and/or synchronization. Thus, the UEs and the pilots may share the same resource elements to allow for the channel estimation and/or the signal synchronization at the respective UE. This may correspond to conventional approaches so as to allow for an implementation of the inventive approach into existing wireless communication systems.

In accordance with embodiments, the apparatus is configured to
provide a data frame including the superimposed signal,
provide a pilot frame including pilot signals to be used by the first user equipment and the second user equipment for channel estimation and/or synchronization, and
transmit the pilot frame including the pilot signals and the data frame including the superimposed signal.

In accordance with embodiments, the apparatus is configured to provide the pilot signals using a third waveform, the third waveform being different from the first waveform and from the second waveform, or the third waveform being the same as one of the first and second waveforms.

In accordance with embodiments of the present invention, the channel estimation and/or synchronization may be improved by providing the pilot and/or synchronization symbols in a frame that is separate from a frame including the data signal. Thus, a first frame, also referred to as data frame, may be provided which includes the data as provided by the superimposed signal and, in addition, a separate pilot frame including the pilot/synchronization signals may be provided. In other words, the apparatus transmits the data frame, which is used by all UEs for the data transmission, and the pilot frame separately, which is used by all UEs for the channel estimation and synchronization. The pilot frame may provide pilot signals modulated using a waveform that is different from the first and second waveforms used for modulating the data of for the respective UEs. Using the separate pilot frame is advantageous because it enables estimation of channel coefficients for both users sharing the same resource, avoiding interference resulting from using different waveforms.

When using the separate pilot frame having pilot signals modulated with a waveform different from the waveforms used for modulating the first and second data signals, the apparatus, in addition to the waveform information transmitted to the UEs/receivers may also transmit to the UEs information about the waveform used for modulating the pilot symbols.

In accordance with embodiments, the apparatus is configured to transmit the pilot frame with a certain periodicity, the periodicity being selected dependent on one or more predefined criteria.

In accordance with embodiments, the apparatus is configured to
estimate a mobility of the first user equipment and the second user equipment,
transmit the pilot frame once at the beginning of a transmission in case the first user equipment and the second user equipment have no mobility,
transmit the pilot frame periodically in case the first user equipment and the second user equipment have a mobility below a predefined threshold, the periodicity chosen from a list of periods according to the estimated channel conditions, and
transmit the pilot frame together with each data frame in case the first user equipment and the second user equipment have a mobility above the predefined threshold. The periodicity may account for tracking the varying channel conditions due to the mobility of a UE. If the user moves fast, the channel changes more rapidly and accordingly the channel estimation has to be updated more frequently and hence a different periodicity of pilot signals may be needed compared to the static case.

In accordance with embodiments,
the pilot frame is used for channel estimation of the channels between the apparatus and the first and second user equipments, and
the apparatus is configured to transmit, at least once during a predefined transmission period, like a predefined number of data blocks, a synchronization signal block including synchronizations signals for the synchronization.

Pilot signals may be used for fine synchronization as well as for channel estimation. Also, the pilot signals may be used for RSRP/RSRQ measurement and the like, depending on the types of pilot signal.

In accordance with embodiments, the apparatus is configured to signal to the first user equipment and to the second user equipment the periodicity of the pilot frame, and the waveform(s) used for the modulation of the pilot signals and/or the synchronization signals.

In accordance with embodiments of the present invention, the pilot frame may be transmitted with a certain periodicity that is selected dependent on predetermined criteria, for example, that is selected on the basis of the mobility associated with a user which is advantageous as dependent on the mobility the frequency for sending the pilot frame may be adjusted thereby reducing an overhead in signaling. For example, users that are at a fixed location receive the pilot frame once as due to the fixed location of the apparatus and the fixed location of the user the channel conditions are most likely to stay stable or the same whereas in situations in which the user is mobile, dependent on the degree of mobility, e.g., either high or low, the transmission of pilot symbols may be performed more often.

The present invention provides an apparatus for serving a plurality of user equipments in a wireless communication system, wherein the apparatus is configured to receive on resources, which are shared by a plurality of user equipments, which include at least a first user equipment and a second user equipment, a superimposed signal including at least a first data signal of the first user equipment and a second data signal of the second user equipment, the first data signal and the second data signal modulated using different waveforms and processed according to a non-orthogonal multiple access, NOMA, scheme, wherein the apparatus is configured to process the received superimposed signal to obtain the first data signal and the second data signal, and wherein the apparatus is configured to demodulate the first data signal and the second data signal on the basis of the waveforms used for modulating the first data signal and the second data signals.

In accordance with embodiments, the apparatus is configured to process the received superimposed signal on the basis of the waveforms used for modulating the first data signal and the second data signals to obtain the first data signal and the second data signal.

In accordance with embodiments, the apparatus is configured to receive information indicating the respective waveforms used for modulating the first data signal and the second data signal prior to the superposition.

Thus, the first aspect of the present invention is also applied when receiving a superimposed signal from a plurality of UEs, like a first UE and a second UE. In such embodiments, the respective UEs generate their respective data signals using different waveforms. For example, a first UE modulates a first data signal to be transmitted to the serving apparatus, like a base station, using a first waveform, and a second UE modulates a second data signal to be transmitted to the serving apparatus using a second waveform. Both UEs transmit the first and second data signals using the same resource so that the bases station receives a superimposed signal including the data signals. The base station separates the superimposed signal into the respective data signals and demodulates the data signals using the respective waveforms, which may have been signaled to the base station. For separating the superimposed signal into the first and second data signals, the base station may apply a successive interference cancellation scheme (SIC)—see e.g., [R1-163111], a parallel interference cancellation scheme (PIC), a message passing scheme (MPA)—see e.g., [R1-162155], an elementary signal estimation scheme (ESE)—see e.g., [R1-165021] or any other known scheme. For the separation of the superimposed signal the base station may also use the information about the different waveforms used for modulating the first data signal and the second data signal, respectively.

Thus, the inventive scheme is not limited to two users, but using a general NOMA scheme may result in a higher number of users sharing the same resources and thus each signal or a group of signals may be optimized with a specific waveform, WF. The different signals may originate from different sources, like different transmitters or UEs, and superimpose at the receiver, like the base station.

Further, the inventive scheme is not limited to the downlink, DL, communication from an apparatus, like a base station, to the users, rather the inventive approach is also for the uplink, UL, communication from the users to an apparatus, like a base station or gNB. Also multi-cell operation is possible and the inventive approach may be extended in a straight forward fashion.

In general, an overlaid signal is given at a receiver, since the receiver is receiving the summation of signals. In the special case of coordinated transmission, the selection of waveforms may be exchanged between transmitters, e.g., using the X2 interface between gNBs. In accordance with embodiments, the following may be signaled to the receiver so that there is knowledge at the receiver for performing the decoding/NOMA-receive processing:

waveform to be used, e.g., as index from a codebook or set of parameters to configure the used transmit/receive filters, and/or the set of NOMA parameters to allow suppressing far-user signal at near-user, e.g.: transmit power (e.g., index of codebook, or value), NOMA sequence generation, e.g., NOMA-specific data-2-constellation mapping interleaver configuration (e.g., index of codebook or value)

suggested receiver (e.g., MPA, SIC, turbo-MPA, MMSE, ESE, ... )

For the UL communication a pre-configuration may be employed based on higher layer information such as cell-load, terminal classes or velocity of the UE, e.g., based on a speed profile UE may choose a suitable configuration of NOMA parameters and waveforms. The signaling may include an overall index from a codebook/bitmap or may include set of values in the UCI message. The gNB may have the ability to adjust a pre-configuration based on a DCI message.

The present invention provides a user equipment served by an apparatus in a wireless communication system, wherein, to receive data from the apparatus on resources shared by the user equipment and at least one further user equipment, the user equipment is configured to receive a superimposed signal including a first data signal of the user equipment and a second data signal of the further user equipment, wherein the first data signal is modulated using a first waveform, and the second data signal is modulated using a second waveform, the first waveform being different from the second waveform.

The present invention provides a method for receiving in a wireless communication system data of a first user equipment on resources shared by the first user equipment and a second user equipment, the method comprising:

receiving a superimposed signal including a first data signal of the first user equipment and a second data signal of the second user equipment, cancelling the second data signal from the superimposed signal, decoding the data from the first data signal, wherein the first data signal is modulated using a first waveform, and the second data signal is modulated using a second waveform, the first waveform being different from the second waveform.

For example, the user may be between two cells and may receive the sum of both data streams. One stream is intended for the user, the other is "interference". Both may be processed with a different WF (transmit filter) and to enable the user to decode the interference (using for example SIC) information on the respective waveform configuration needs may be signaled to the user.

In accordance with embodiments, the user equipment is configured to receive a non-orthogonal multiple access, NOMA, transmission including the superimposed signal.

In accordance with embodiments,
in case the pathloss or signal attenuation on the channel between the user equipment and the apparatus is less than the pathloss or signal attenuation on the channel between the further user equipment and the apparatus, or in case the user equipment is closer to the apparatus than the further user equipment, the user equipment is configured to receive from the apparatus information indicating the first waveform used for the modulation of the first data signal and the second waveform used for the modulation of the second data signal, and
in case the pathloss or signal attenuation on the channel between the user equipment and the apparatus is greater than the pathloss or signal attenuation on the channel between the further user equipment and the apparatus, or in case the user equipment is farther from the apparatus than the further user equipment, the user equipment is configured to receive from the apparatus information indicating the first waveform used for the modulation of the first data signal.

In accordance with the first aspect of the present invention, the user equipment receives the superimposed signal and, in accordance with embodiments receives additional information about the waveforms used for modulating/demodulating the respective data signals included in the superimposed signal in case the user equipment is a near UE. In case the UE is the far UE, only information about the waveform used for its data signal may be received as the other signal portions in the superimposed signal are seen as low noise or low interference signals at the far UE. Thus, receiving the respective data signals at the intended UE is improved in accordance with the first aspect of the present invention by using the appropriate waveforms and signaling the used waveform to the UE so that proper decoding of the information is possible. The decoding is more successful when compared to conventional approaches as the waveform used for modulating the data signal is selected dependent on the actual condition of the channel between the UE and the apparatus thereby yielding better decoding results.

In accordance with embodiments, user equipment is configured to
receive from the apparatus a data frame including the superimposed signal, and
receive from the apparatus a pilot frame including pilot signals to be used by the user equipment for channel estimation and/or synchronization.

In accordance with embodiments,
the pilot frame is used only for channel estimation of the channel between the apparatus and the user equipment, and
the user equipment is configured to receive from the apparatus a synchronization signal block including synchronizations signals for the synchronization.

In accordance with embodiments,
the apparatus is configured to transmit the pilot frame with a certain periodicity and/or the synchronization signal block, the periodicity for transmitting the pilot frame being selected at the apparatus dependent on one or more predefined criteria, the synchronization signal block being transmitted at least once during a transmission, and
the user equipment is configured to receive from the apparatus information indicating the periodicity of the pilot frame.

In accordance with embodiments, the user equipment is configured to receive from the apparatus information indicating the waveform(s) used for the modulation of the pilot signals and/or the synchronization signals.

Second Aspect

The present invention provides an apparatus for serving a plurality of user equipments in a wireless communication system, wherein, for transmitting data of a plurality of user equipments, which include at least a first user equipment and a second user equipment, on resources shared by the plurality of user equipments, the apparatus is configured to
process the first data signal and the second data signal according to a pathloss or signal attenuation on a channel between the first and second user equipments and the apparatus or according to the geographical locations of the first user equipment and the second user equipment relative to the apparatus,
superimpose the first data signal and the second data signal, and
modulate the superimposed signal using a certain waveform,
wherein the first data signal and the second data signal are further processed according to a mobility of the first user equipment and the second user equipment.

The present invention provides a method for transmitting in a wireless communication system data of a plurality of user equipments, which include at least a first user equipment and a second user equipment, on resources shared by the plurality of user equipments, the method comprising:
processing the first data signal and the second data signal according to a pathloss or signal attenuation on a channel between the first and second user equipments and the apparatus or according to the geographical locations of the first user equipment and the second user equipment relative to the apparatus,
superimposing the first data signal and the second data signal, and
modulating the superimposed signal using a certain waveform,
wherein the first data signal and the second data signal are further processed according to a mobility of the first user equipment and the second user equipment.

In accordance with embodiments, the apparatus is configured to estimate the mobility of the first user equipment and the second user equipment.

In accordance with embodiments, the apparatus is configured to encode the first data signal and the second data signal prior to processing the first data signal and the second data signal. This embodiment enables the processing assuming multiple distributed transmitters, e.g. two UEs in UL or two gNBs in a coordinated DL.

In accordance with the second aspect of the present invention, rather than taking into consideration only the location or position of a user with respect to the apparatus, users are grouped taking into consideration in addition the user mobility and the different use cases which may be supported by the wireless communication system, like the 5G system. Taking into consideration, in addition to the UE's relative location (near and far user grouping), also other UE characteristics, like the mobility, improves the performance of the data transmission towards the UEs as, dependent on the mobility, specific information may be transmitted differently dependent on a mobility of a user or a group of users and/or the parameters for the transmission may be adapted dependent on the mobility of the user or the group of users. For example, when considering the parameters part, the frame structure differs according to the mobility as mentioned above, where high mobility user have to transmit a pilot frame with higher periodicity in comparison with a low-mobility case. Thus, users with different mobility may be grouped together.

In accordance with embodiments, the apparatus is configured to
- transmit a pilot frame including pilot signals and a data frame including the superimposed signal, the pilot frame being separate from the data frame, the pilot signals to be used by the first user equipment and the second user equipment for channel estimation and/or synchronization, and
- transmit the pilot frame with a certain periodicity, the periodicity being selected dependent on the mobility of the first user equipment and the second user equipment.

In accordance with embodiments, the apparatus is configured to
- transmit the pilot frame once at the beginning of a transmission in case the first user equipment and the second user equipment have no mobility,
- transmit the pilot frame periodically in case the first user equipment and the second user equipment have a mobility below a predefined threshold, the periodicity chosen from a list of periods according to the estimated channel conditions, and
- transmit the pilot frame together with each data frame in case the first user equipment and the second user equipment have a mobility above the predefined threshold.

In accordance with embodiments, the apparatus may send separate pilot and data frames including pilot signals and data signals towards the UEs wherein the periodicity with which the pilot frames are sent depends on the mobility of the user equipment so that signaling overhead may be reduced as the periodicity of frequency of transmitting the pilot frame may be adjusted dependent on the mobility. For example, users with no mobility may need a transmission of the pilot symbol less frequently than users with a higher mobility and, in some cases, they may not require any retransmission but a single transmission of the pilot symbols for estimating the channel and for synchronizing with the apparatus may be sufficient. This reduces the signaling overhead for the transmission within the wireless system.

In accordance with embodiments, the apparatus is configured to provide the pilot signals using a waveform being the same or being different from the waveform used for modulating the first and second data signals.

In accordance with embodiments, for processing the first data signal and the second data signal, the apparatus is configured to
- allocate a first power level to the first data signal and a second power level to the second data signal, the first power level being different from the second power level, and/or
- apply a first spreading sequence to the first data signal and a second spreading sequence to the second data signal, the first spreading sequence being different from the second spreading sequence.

Wireless Communication System

The present invention provides a wireless communication system, comprising:
- one or more apparatus s in accordance with the present invention, and
- a plurality of user equipments in accordance with the present invention.

In accordance with embodiments, a pathloss or signal attenuation on a channel between a first user equipment and the apparatus is less than a pathloss or signal attenuation on a channel between a second user equipment and the transmitter, or the first user equipment is located at a first geographical location and the second user equipment is located at a second geographical location, the first geographical location being closer to the apparatus than the second geographical location.

In accordance with embodiments, the user equipment comprises one or more of a mobile or stationary terminal, an IoT device, a ground based vehicle, an aerial vehicle, a drone, a building and any other item or device provided with network connectivity enabling the item/device to communicate using the wireless communication network, and the apparatus comprises one or more of a transmitter, a receiver, a transceiver, a macro cell base station, a small cell base station and a transmission/reception point (TRP) enabling an item or a device provided with network connectivity to communicate using the wireless communication network.

The base stations may perform their processing independently or in a coordinated fashion by assuming a certain information exchange between each other, e.g. by the using X2 interface or other higher layer procedures.

The transmitters/transceivers may comprise one or more UEs, where the processing may be carried out based on DCI, higher layer procedures or a pre-configuration and a + signaling in the UCI. gNBs may override pre-configuration assumptions using DCI or higher layer procedures.

The transmitters and receivers may comprise one or more UEs, e.g., V2V or V2X.

The transmitters and receivers may comprise one or more gNBs, e.g., a macro, a small, etc.

Computer Program Product

The present invention provides a computer program product comprising instructions which, when the program is executed by a computer, cause the computer to carry out the one or more methods of in accordance with the present invention.

Thus, the present invention teaches two aspects for improving the communication of data within a wireless communication system using superimposed signals including data signals of a plurality of user equipments using the same resources. In accordance with the first aspect independent waveforms are used for modulating the data signals thereby allowing for adapting the modulation to the channel conditions of the channels between the transmitter and the respective UEs, thereby improving the transmission performance. In accordance with the second aspect the user grouping is extended beyond the mere grouping based on the relative position of the UE with respect to the transmitter. An additional criterion is used, namely the mobility of the user equipment. The second aspect allows reducing the amount of control signaling needed for the data transmission.

Although the above mentioned aspects of the inventive approach have been mentioned independent from each other, they may be combined in a single wireless communication system, for example, the system may include transmitters which use independent waveforms for modulating data signals to be superimposed for transmission to respective users on shared resources, with or without the additional criterion for grouping users dependent on their mobility. The transmitters may also implement approaches using conventional superposition transmission schemes, like conventional MUST schemes, with the additional grouping of the users dependent on their mobility.

In the following, embodiments of the inventive approach are described in more detail.

First Aspect

Figure 3:
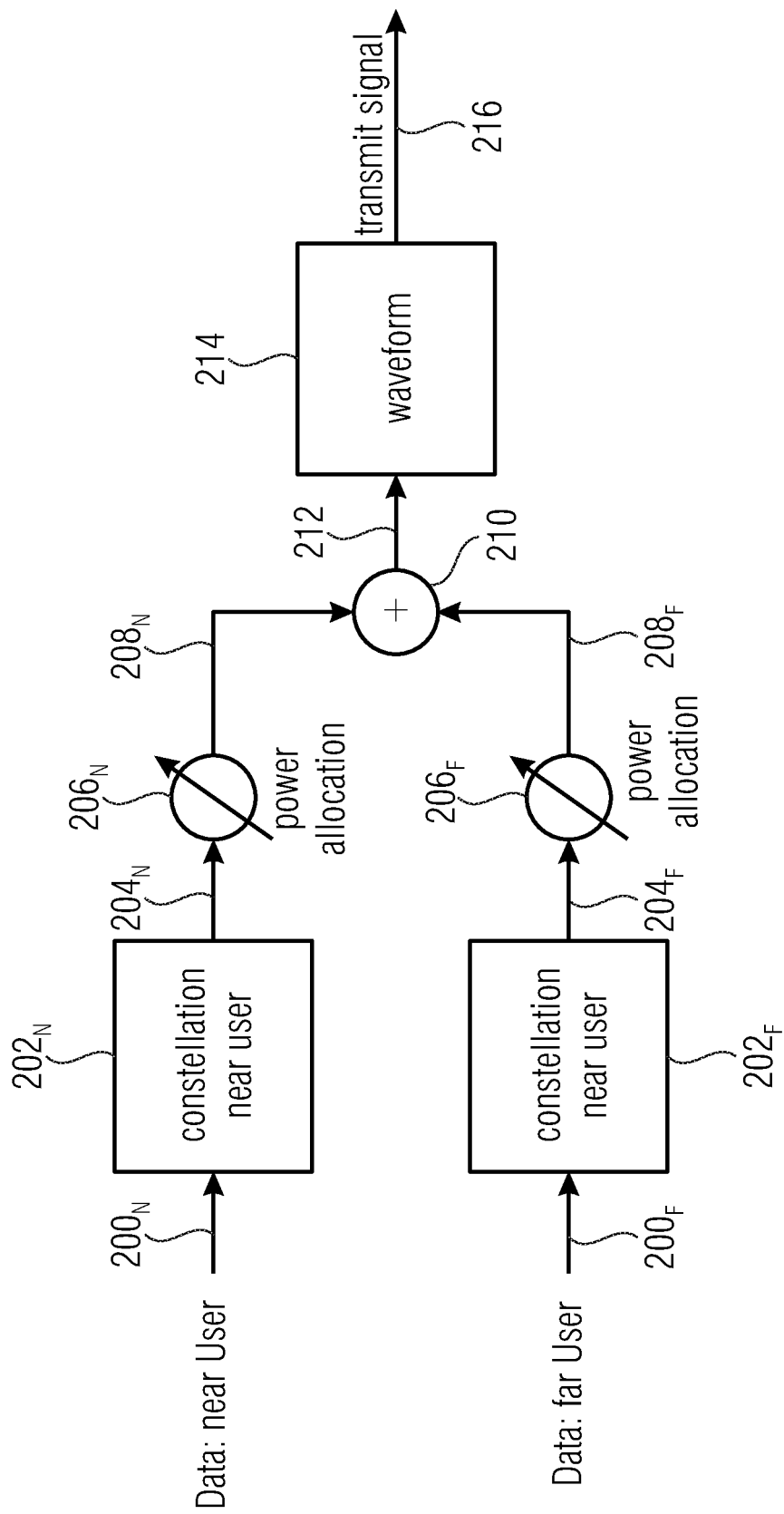
FIG. 3 is a block diagram illustrating the principle of the multi-user superposition transmission, MUST, scheme.
Figure 4:
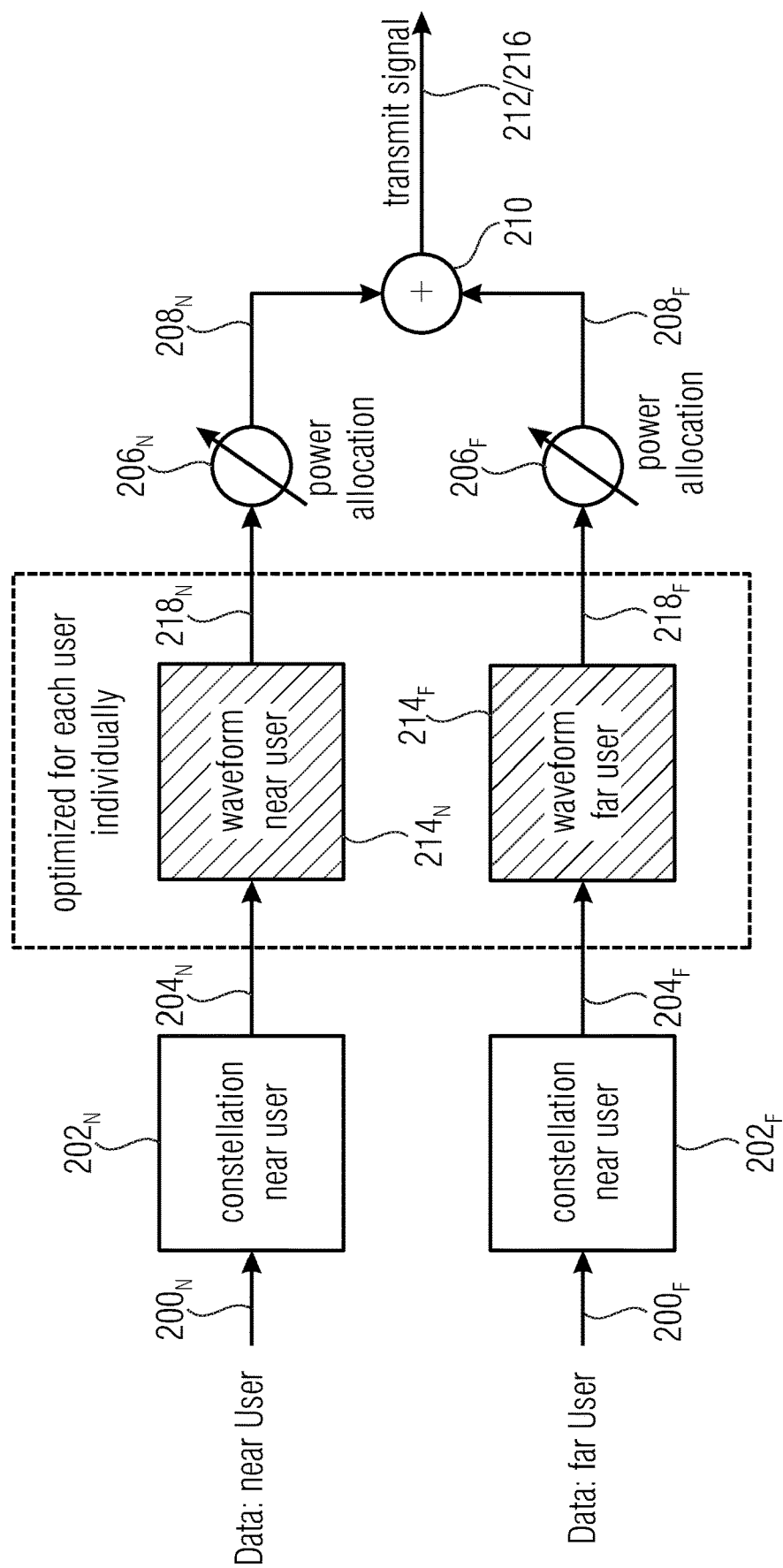
FIG. 4 is a block diagram illustrating the inventive downlink multi-user superposition transmission scheme in accordance with an embodiment.

FIG. 4 is a block diagram illustrating the inventive downlink multi-user superposition transmission scheme in accordance with an embodiment. In a similar way as described above with reference to FIG. 3, two users are assumed, namely a near user and a far user which, in accordance with embodiments, are determined based on their location relative to the transmitter either dependent on a measured path-loss on a channel between the UE and the transmitter or dependent on the actual geographical location. The data to be transmitted to the near user is provided as a first data stream or as a first data signal $200_N$ to the transmitter and may be encoded in accordance with a constellation $202_N$ for the near user. In accordance with the inventive approach, the encoded first data signal $204_N$ is applied to a near user waveform block $214_N$ to be modulated, and the modulated first data signal $218_N$ is applied to the power allocation circuit $206_N$ applying a power level to the modulated signal $218_N$ that is smaller than a power level applied to a signal of the far user. In a similar way, data of the far user is provided as a second data stream or a second data signal $200_F$ to the transmitter and may be encoded using the constellation $202_F$ for the far user. The encoded second data signal $204_F$ is applied to a second waveform block $214_F$ for the far user to be modulated, and the modulated second signal $218_F$ is applied to the power allocation circuit $206_F$ to have applied thereto a power level that is higher than the power level applied to the modulated first data signal $218_N$. The output signals $208_N$ and $208_F$ of the power allocation circuits $206_N$, $206_F$ are supplied to a combiner 210 which yields as the output signal the superimposed signal 212 which is now also the signal to be transmitted via the radio link to the respective users.

As may be seen from a comparison of FIG. 3 and FIG. 4, in accordance with the inventive approach, the data streams for the two users are modulated independent from each other prior to being superimposed whereas conventional approaches apply the modulation using a common waveform once the signals have been superimposed.

Figure 5:
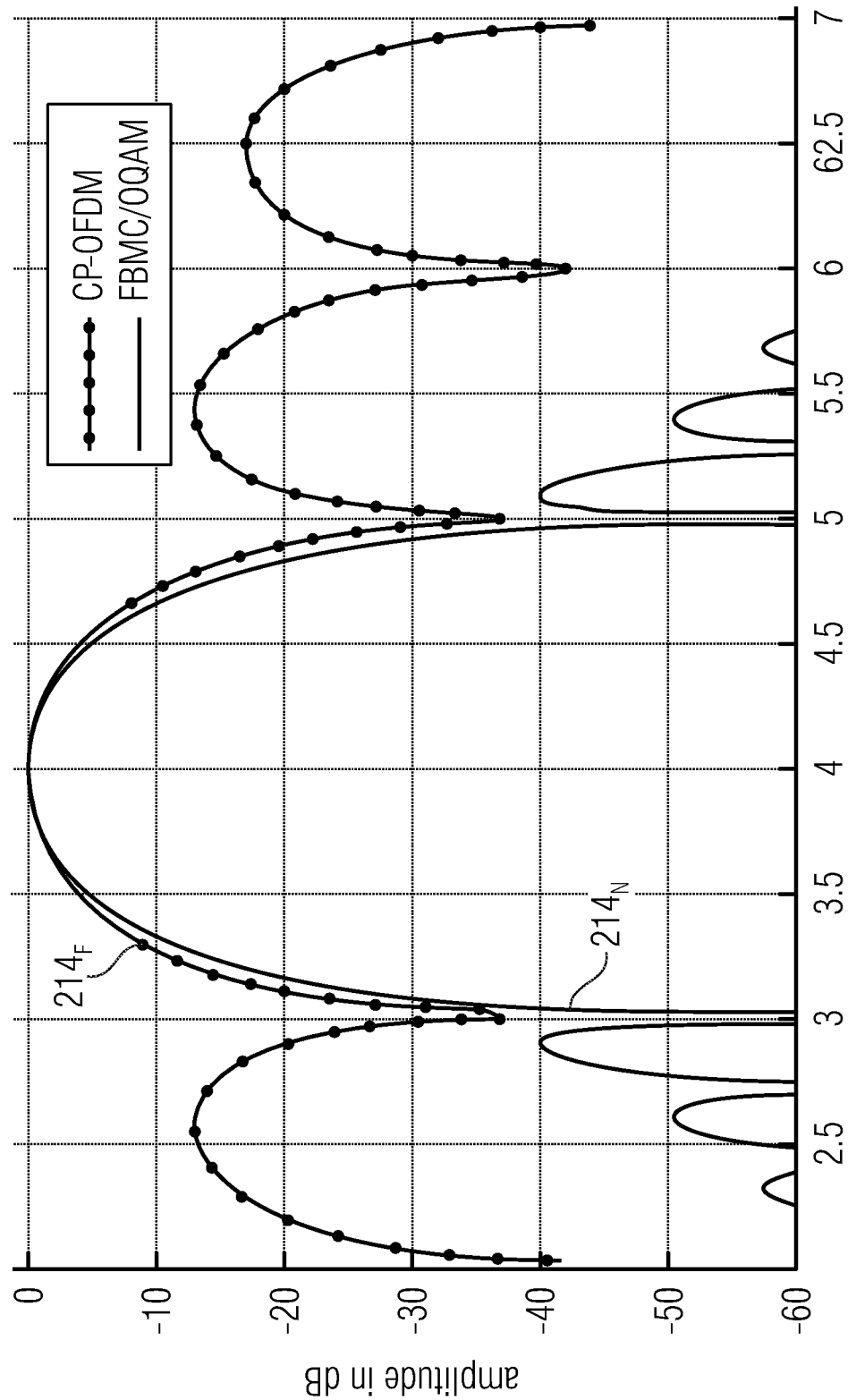
FIG. 5 shows an example of the power spectrum density of two time signals transmitted over the same time and frequency modulated using different waveforms.

In accordance with the first aspect of the present invention, the independent waveforms $214_N$ and $214_F$ for the respective data streams may be selected dependent on the channel characteristics of each of the UEs which share the same resources, like the same time-frequency resource elements, REs. While in conventional approaches, the frequency responses per sub-carrier, FRPSs, overlap because the same waveform is used for modulating the signals, in accordance with the present invention the frequency responses per sub-carrier do not overlap as the different waveforms used for separately modulating the signals have different FRPSs. FIG. 5 shows an example of the power spectrum density, PSD, of two time signals transmitted over the same time and frequency but modulated using different waveforms. FIG. 5 shows the PSD when applying a CP-OFDM waveform for modulating the data signal of the near UE as indicated by reference sign $214_N$, and a FBMC/OQAM waveform for modulating the data signal of the far UE as indicated by reference sign $214_N$. In accordance with other embodiments, different FRPSs are obtained when applying CP-OFDM with a CP size as in the normal mode for modulating the data signal of one of the UEs, and when applying CP-OFDM with a CP size as defined in the extended mode for modulating the data signal of the other one of the UEs. Yet other embodiments yielding different FRPSs use a CP-OFDM waveform for modulating the first UE data signal and a FBMC waveform for modulating the data signal of the other UE.

The transmit signal 216 is received at the respective UEs, and the far UE may decode its data without knowledge about the near user as the near user's signal, the first data signal, is considered noise. On the other hand, the near user first decodes the far user's signal and then, for example through applying successive interference cancellation, SIC, removes the far user's signal from the received signal so as to decode the first data signal from the remaining signal. It is noted that the present invention is not limited to successive interference cancellation schemes for decoding the data at the near user, rather other techniques may be employed, for example, successive interference cancellation (SIC)-based [R1-163111], message passing based (MPA)-based [R1-162155] or elementary signal estimator (ESE)-based [R1-165021].

In accordance with embodiments, channel estimation in a system employing the inventive approach may be done as in conventional approaches, i.e., the pilot sequences or symbols for channel estimation may be embedded into the frame also including the data symbols.

This allows extracting the pilot sequences so that the channel estimation/synchronization may be performed. In accordance with further embodiments, when using the inventive approach of using independent waveforms for modulating the data streams prior to superimposing them into the transmit signal, additional information may be signaled so as to take into consideration the effects of the different waveforms used for modulating the data signals when calculating the estimated channel coefficients.

Figure 6:
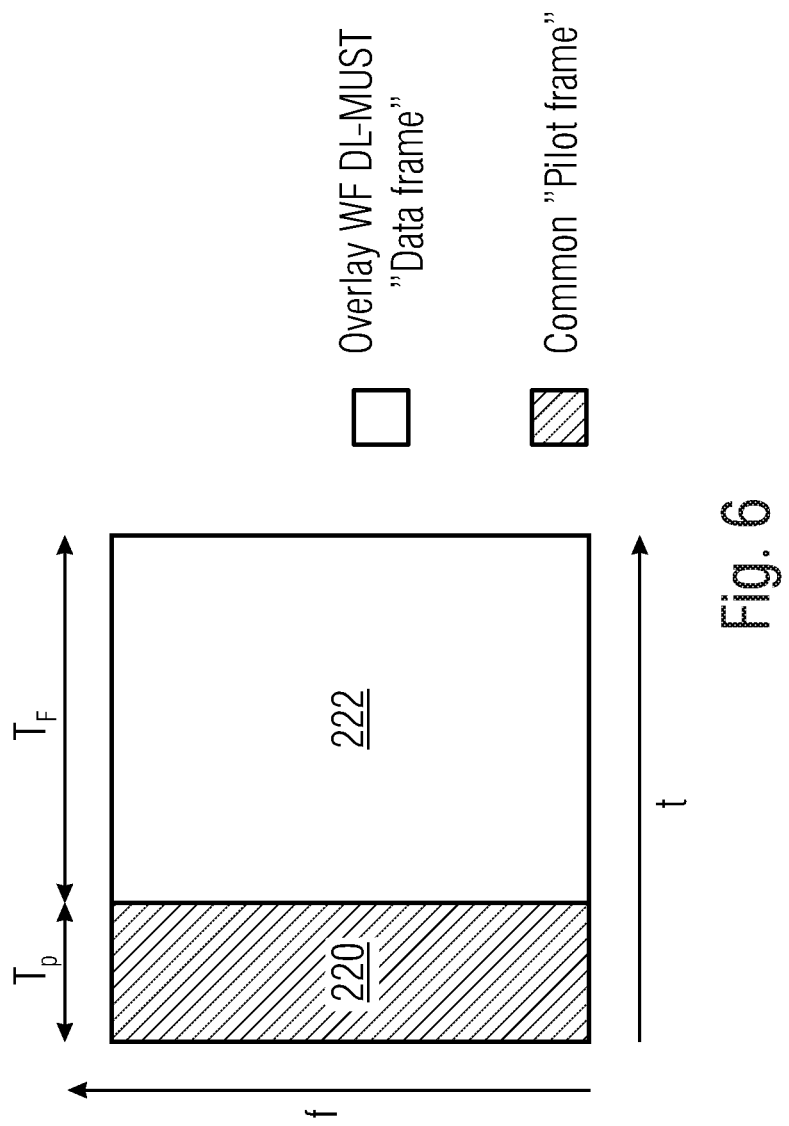
FIG. 6 shows an example of a frame structure for an overlay waveform downlink transmission in accordance with embodiments of the present invention.

In accordance with embodiments a new frame structure is provided including two types of frames. FIG. 6 shows an example of a frame structure for an overlay waveform downlink transmission in accordance with embodiments of the present invention. As may be seen from FIG. 6, the new frame structure includes a pilot frame 220 and a data frame 222. The pilot frame 220 is used by all UEs for channel estimation and synchronization, and the data frame 222 is used by all UEs for the data transmission. In accordance with embodiments, the pilot frame 220 and the data frame 222 may have different waveforms, i.e., the pilot signals or pilot symbols may be modulated using a waveform that is different from the waveforms used for modulating the first data signal and the second data signal included in the data frame. In such an embodiment, the waveform used for modulating the pilot symbol is communicated to the respective near and far users to allow them to correctly extract the channel coefficients to be used for the signal decoding. In accordance with other embodiments, the pilot symbols for the respective UEs may be modulated also with different waveforms, advantageously with the same waveforms that are also used for modulating the first data signal or the second data signal. In this scenario, it is not necessary to signal the waveform used for modulating the pilot symbols as the information about the first and second waveforms is already transmitted to the user equipments to allow for the correct decoding of their data signals.

In accordance with further embodiments, the users, which receive data signals using the superimposed signal, may be grouped not only dependent on their location relative to the transmitter, either determined on the basis of the path-loss/signal attenuation on the respective channels or on the actual geographical location, but additional criteria may be included identifying the mobility of the UEs. The users may be grouped dependent on their mobility so that, for example, users having no mobility, e.g., fixed devices like sensors or actuators or the like, are provided with signals modulated with a waveform that is most suitable for such users having no mobility. On the other hand, other waveforms which are more suitable for users having an increased mobility may be selected.

Figure 7:
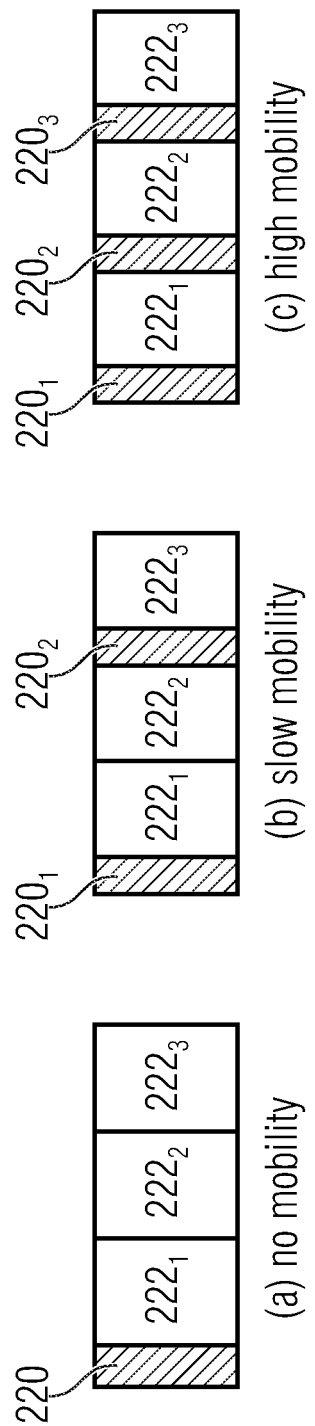
FIG. 7 shows examples of transmitted frame structures for different mobility cases, wherein FIG. 7(*a*) shows the frame structure for a no mobility scenario, FIG. 7(*b*) shows the frame structure for a slow or minimal mobility scenario, and FIG. 7(*c*) shows the frame structure for a high mobility scenario.

In accordance with embodiments of transmitters using separate pilot and data frames, different frame structures may be selected for different mobility cases, and the selected frame structure may be communicated from the transmitter to the UEs to support decoding the data. For example, three different mobility cases may be considered, and FIG. 7 shows examples of transmitted frame structures for the different mobility cases. FIG. 7(a) shows the frame structure for a no mobility scenario, FIG. 7(b) shows the frame structure for a slow or minimal mobility scenario, and FIG. 7(c) shows the frame structure for a high mobility scenario. In the no mobility scenario of FIG. 7(a) there is no need for the transmission of pilots for each frame as the channel is assumed to be stable due to the non-moving UE. Thus, the pilot frame 222 is transmitted once and is followed by the three data frames $222_1$ to $222_3$ without retransmission of the pilot frame there between. This avoids a huge spectral inefficiency and channel estimation is done just in the initial setup phase using the pilot frame 220.

In the slow or minimal mobility scenario of FIG. 7(b) the channel estimation is done at predefined intervals, for example at intervals determined according to an expected rate of change in the channel conditions so that, for example, the pilot frame $220_1$ is sent initially followed by two data frames $222_1$ and $222_2$ and then the pilot frame is sent again as indicated at $220_2$ followed by the third data frame $222_3$. Thus, the pilot frame is not transmitted with each data frame, but only at instances in time at which a channel condition is expected or detected to have changed to a degree that a retransmission of the pilot frame for a new channel estimation is needed, however, still the huge spectral inefficiency associated with transmitting each data frame together with the pilot frame is avoided.

The high mobility scenario shown in FIG. 7(c) assumes a situation in which the channel conditions are expected to be changing with a high rate so that each of the data frames has associated therewith the pilot frame which is similar to conventional approaches in accordance with which each data frame includes data signals and pilot signals.

In accordance with embodiments of the present invention, for the downlink synchronization a preamble based signal synchronization block may be used that is transmitted once for a transmission. In accordance with other embodiments, the synchronization signal has a form so that it may also be used for the channel estimation. Thus, in accordance with embodiments the pilot frame may be considered a preamble frame including a signal synchronization block, SS block, that is used both for synchronization and channel estimation which allows for a further reduction of the signaling overhead, thereby increasing the transmission efficiency.

In accordance with embodiments, implementing the inventive approach goes together with additional information signaled for synchronization, channel estimation and reception, like SIC reception. For example, the near UE, that decodes first the far UE signal to be subtracted from the received superimposed signal using, for example, a SIC receiver, and then decodes its signal, may receive the whole or a part of the following information:

in case the above described frame structure dependent on the user mobility is used, information about the frame structure chosen by the transmitter in accordance with the user's mobility so that the receiver at the UE recognizes the pilot and data frames to support synchronization, channel estimation and data extraction, the type of waveform used for modulating the pilot symbols in the pilot frame so as to correctly estimate the channel coefficients and to successfully synchronize the receiver to the received signal, the type of waveform used for modulating the data signal of the far UE for decoding the far UE's data signal correctly for performing a successful SIC, and the type of waveform used by the transmitter for modulating the data signal of the near UE for a successful data extraction after SIC.

The far UE, which does not perform a SIC processing at its receiver, may receive the whole or a part of the following information:

in case the above described frame structure dependent on the user mobility is used, information about the frame structure chosen by the transmitter in accordance with the user's mobility so that the receiver at the UE recognizes the pilot and data frames to support synchronization, channel estimation and data extraction, the type of waveform used for modulating the pilot symbols in the pilot frame so as to correctly estimate the channel coefficients and to successfully synchronize the receiver to the received signal, the type of waveform used by the transmitter for modulating the data signal of the far UE for a successful data extraction.

Thus, less information needs to be signaled to the far UE when compared to the near UE due to fact that no SIC is applied at the far UE. The above summarized information to be transmitted to the far UE/near UE may be included within the SS block or within the pilot frame or within a control channel carrying, for instance, downlink control information (DCI) or within a higher-layer signaling (e.g., MAC CE or RRC signaling) or within a combination of the control channel and the higher-layer signaling.

Second Aspect

In accordance with the second aspect of the present invention, the conventional way of grouping users based on their position relative to the transmitter is extended by a further criterion for grouping, namely the user mobility. Thus, in a conventional process for superimposing signals as described above with reference to FIG. 3, the near user/far user are not only determined dependent on their path-loss/signal attenuation or dependent on the actual geographical location, but, in addition, users of different mobility levels are grouped together wherein the mobility levels may be those as described above in accordance with the first aspect. In accordance with the second aspect user grouping is dependent not only on the user's position but also on the user's mobility thereby allowing that grouped users are treated in a similar way for transmitting data thereto, for example in such a way that they share the same frame structure including for example the above described data and pilot frames sent with a periodicity as explained with reference to FIG. 7.

General

It is noted that, in accordance with embodiments, a wireless communication system may include transmitters implementing both aspects described above so that for a plurality of users the grouping may be done only on the basis of their relative location and the data transmission using the superimposed signal includes independently modulating the respective data signals prior to superimposing them. Alternatively, the conventional way of producing the superimposed signal may be applied and the users may be grouped taking into consideration the additional mobility criteria mentioned above.

In accordance with embodiments, the user's position may be estimated by the transmitter using, for example, the reference signal received power, RSRP, and the reference signal received quality, RSRP. In accordance with other embodiments, the geographical location may be obtained by conventional LTE positioning protocols. The user mobility, in accordance with embodiments, may be determined based on the RSRP and the RSRQ along with the sounding reference signal SRS.

The inventive approach as described herein may be used for smart city situations in which a high number of UEs or receivers is provided, for example, in the form of traffic lights or any type of sensor/actuators (pressure, temperature, C02 emission-sensor, etc.). Another scenario where the inventive approach may be implemented is a Giga-factory approach including a plurality of UEs/receivers for the transmission of sensor based data, for example temperature data, pressure data and the like, from various locations or machines within the factory.

In the above description of the embodiments of the different aspects of the inventive approach, reference has been made to superpositioning approaches applying different power levels to the modulated data signals of the far and near users, however, the present invention is not limited to such approaches. Rather, in accordance with other embodiments, the modulated signals of the users may be processed in different terms, for example, by applying different spreading sequences, interleaver/scrambling sequences, different power allocation or a NOMA scheme indicated in the table above.

Embodiments of the present invention are advantageous when compared to conventional technology approaches as they offer a better Block Error Rate, BLER, performance because the waveforms for modulating the respective user data are selected independent from each other, e.g., according to a condition of a channel between the respective user and the transmitter. The inventive approach further increases the reliability of the transmission of the data. Further, embodiments of the invention are advantageous as they provide for a flexible scheme that considers the user mobility which improves the performance in terms of BLER and spectral efficiency by using waveforms adapted to each users channel conditions, thus improving the receive SNR. For example, when not using waveforms adapted to each user's channel conditions, for example when using a general waveform for all users, a sub-optimal performance is achieved over all users because the WF has to be suited to the user with the poorest channel condition, hence users with good channels will suffer.

Further, in the above-described embodiments, reference has been made to base stations, however, the inventive approach is not limited to base stations as described above with reference to FIG. 1 or FIG. 2, rather, it applies to any transmitter or transceiver apparatus in a wireless communication network or system for providing a wireless communication with a user equipment having a configuration as outlined above. Thus, the transceivers or transmitters in accordance with the inventive approach may comprise the above-described base stations but also other entities, like road side units, moving base stations, street furniture (e.g. lamp posts, traffic lights, bus stops, . . . ), platoon leaders, etc.

Figure 2:
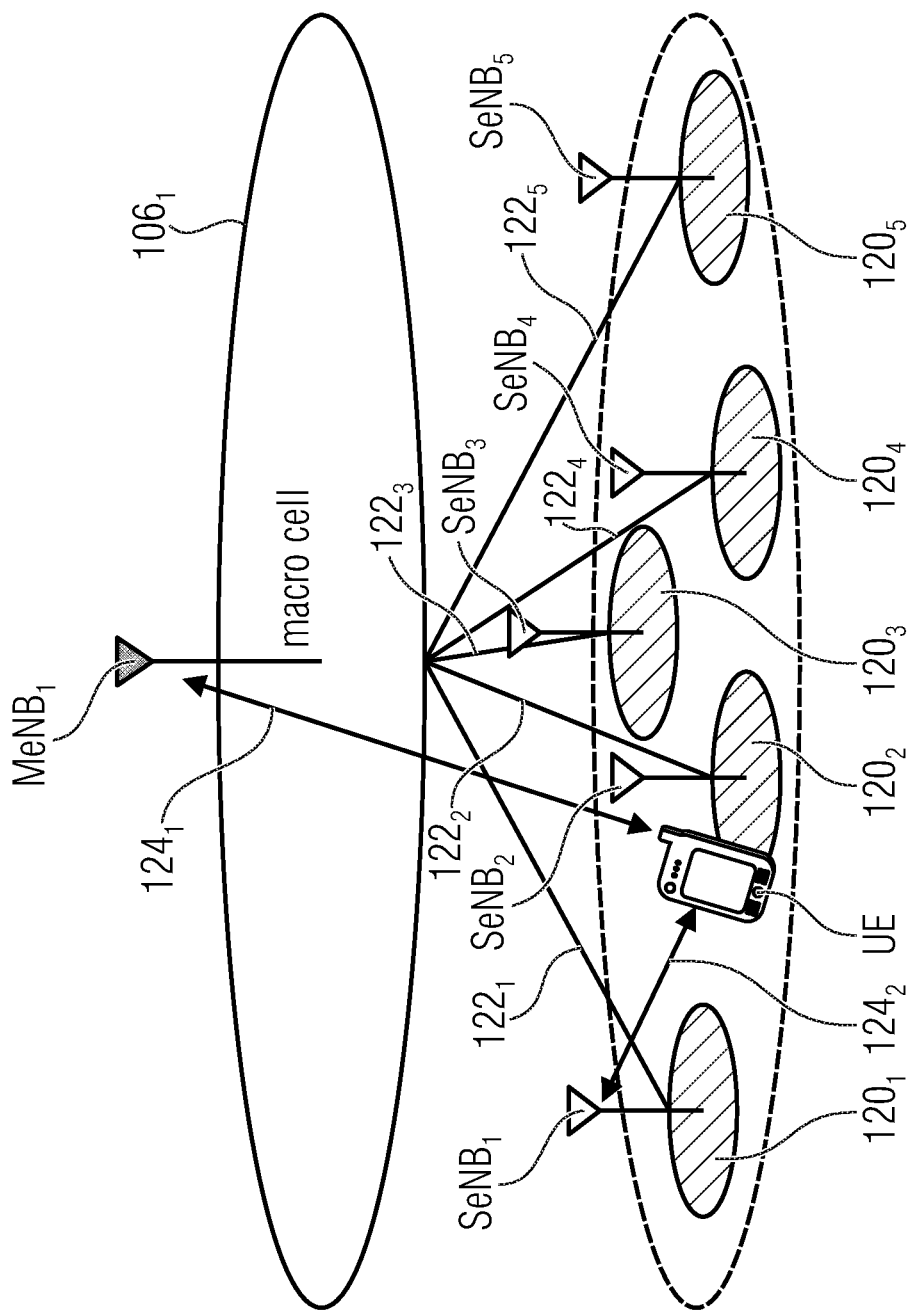
FIG. 2 is a schematic representation of a cell in FIG. 1 having two distinct overlaid networks, the networks comprising a macro cell network including a macro cell and a small cell network.
Figure 8:
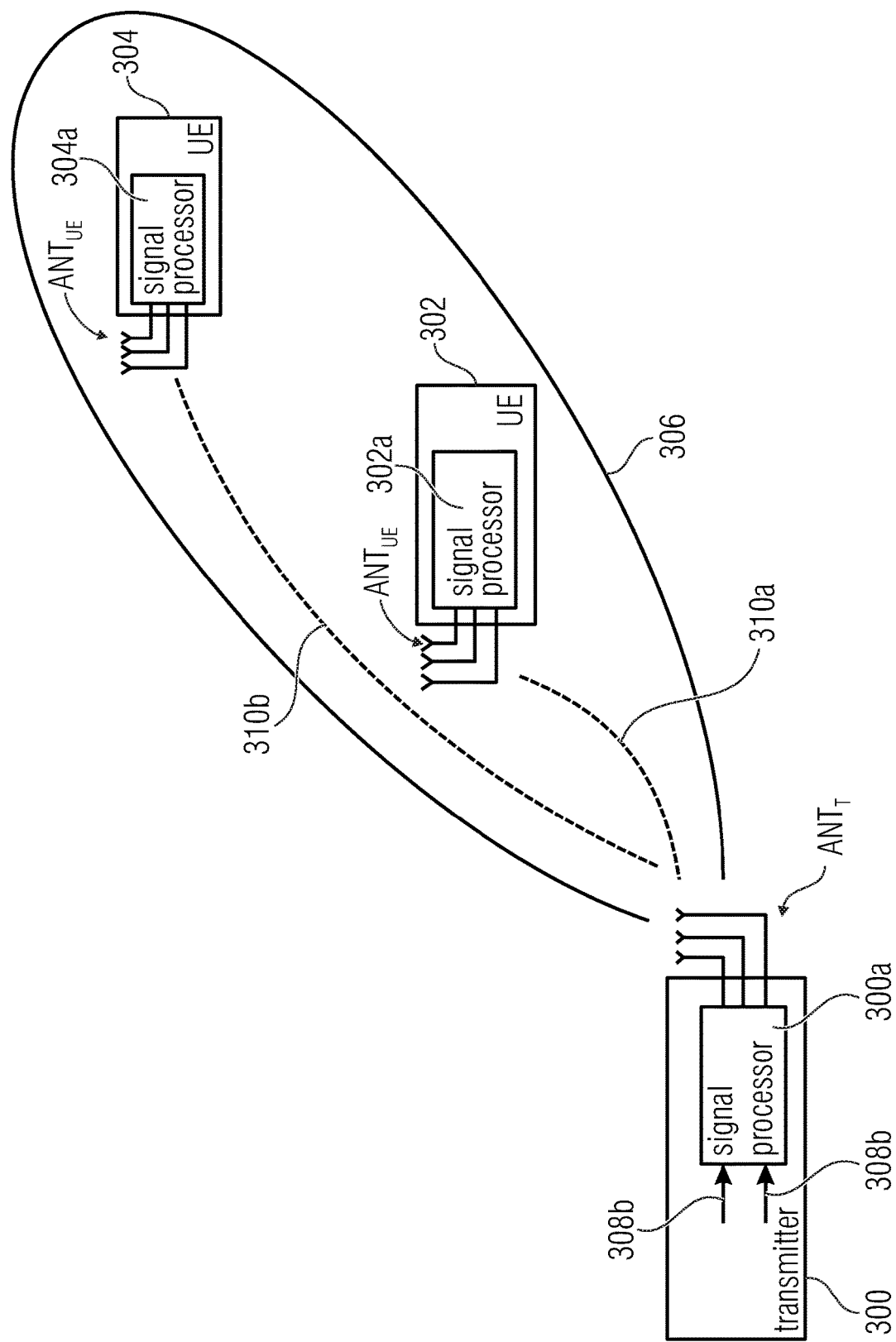
FIG. 8 is a schematic representation of a wireless communication system for communicating information between a transmitter and a plurality of UEs operating in accordance with the present invention.

Embodiments of the present invention may be implemented in a wireless communication system as depicted in FIG. 1 or FIG. 2 including base stations and users, like mobile or stationary terminals or IoT devices. FIG. 8 is a schematic representation of a wireless communication system for communicating information between a transmitter or transceiver 300 and a plurality of UEs 302, 304. The transmitter 300 and the UEs 302, 304 may communicate via a wireless communication link 306, like a radio link, using the same resources. The transmitter 300 includes one or more antennas $ANT_T$ or an antenna array having a plurality of antenna elements, and a signal processor 300a. The transmitter 300 may operate in accordance with the inventive teachings described herein. Each of the UEs 302 and 304 includes one or more antennas $ANT_{UE}$ or an antenna array having a plurality of antenna elements, and a signal processor 302a, 304a. The respective UEs may operate in accordance with the inventive teachings described herein.

In accordance with the first aspect of the inventive approach, the transmitter 300 serves a plurality of user equipments and for transmitting data of the first or near UE 302 and data of the second or far UE 304 on resources shared by the near and far UEs 302, 304, the signal processor 300a of the transmitter 300 may have a structure as described above with reference to FIG. 4. The signal processor 300a independently modulates the first data signal 308a for the near UE 302 and the second data signal 308b for the near UE 302 using the different waveforms prior to superimposing the first and second data signals 308a, 308b, and processes the first data signal 308a and the second data signal 308a according to a pathloss or signal attenuation on a channel 310a, 310b between the near and far UEs 302, 304 and the transmitter 300, respectively. In another embodiment, the first data signal 308a and the second data signal 308a are processed according to the geographical locations of the near and far UEs 302, 304 relative to the transmitter 300. The processed first data signal 308a and the processed second data signal 308b are superimposed, thereby forming, e.g., the transmit signal 306.

In accordance with the second aspect of the inventive approach, the transmitter 300 serves a plurality of user equipments and for transmitting data of the first or near UE 302 and data of the second or far UE 304 on resources shared by the near and far UEs 302, 304, the signal processor 300a of the transmitter 300 may have a structure as described above with reference to FIG. 3. The signal processor 300a independently encodes the first data signal 308a for the near UE 302 and the second data signal 308b for the far UE 304 prior to superimposing the first and second data signals 308a, 308b, and processes the first data signal 308a and the second data signal 308a according to a pathloss or signal attenuation on a channel 310a, 310b between the near and far UEs 302, 304 and the transmitter 300, respectively. In another embodiment, the first data signal 308a and the second data signal 308a are processed according to the geographical locations of the near and far UEs 302, 304 relative to the transmitter 300. Further, the first data signal 308a and the second data signal 308b are processed prior to superimposing according to a mobility of the first user equipment and the second user equipment. The processed first data signal 308a and the processed second data signal 308b are superimposed, and the superimposed signal is modulated using a certain waveform, thereby forming, e.g., the transmit signal 306.

The near UE 302 and the far UE 304 receive data from the transmitter 300 on the resources 306 shared by the near and far UEs 302, 304. Each of the UEs 302, 304 receives the superimposed signal 306 including the first data signal 308*a* for the near UE 302 and the second data signal 308*a* for the far UE 304, wherein the first data signal is modulated using a first waveform, and the second data signal is modulated using a second waveform, the first waveform being different from the second waveform. The near UE 302 has a pathloss or signal attenuation on the channel 310*a* between the near UE 302 and the transmitter 300 that is less than a pathloss or signal attenuation on the channel 310*b* between the far UE 304 and the transmitter 300. In accordance with other embodiments, the near UE 302 is closer to the transmitter 300 than the far UE 304. The near UE 304 receives from the transmitter 300 information indicating the first waveform used for the modulation of the first data signal 308*a* and the second waveform used for the modulation of the second data signal 308*b* to cancel the second data signal from the superimposed signal and to decode the data from the remaining first data signal. The far UE 304 receives from the transmitter 300 information indicating the second waveform used for the modulation of the second data signal 308*b* and decodes the data from the superimposed signal.

Figure 9:
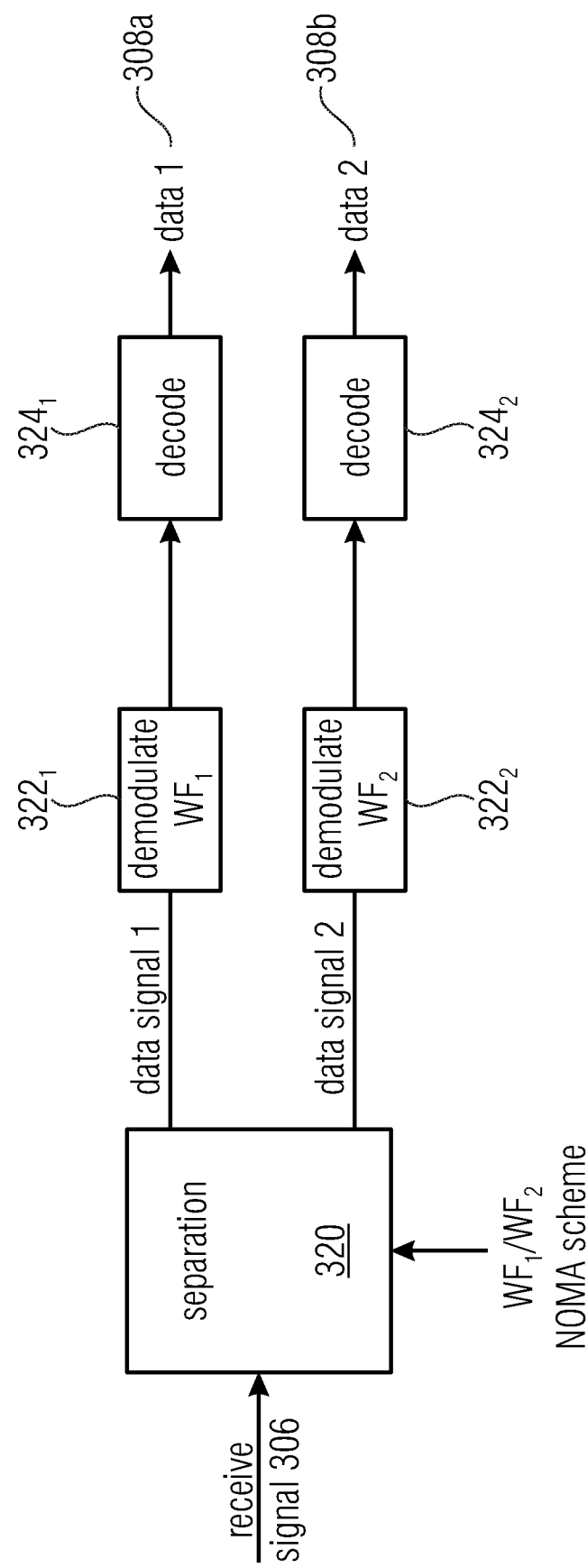
FIG. 9 is a block diagram illustrating the inventive uplink multi-user superposition transmission scheme in accordance with an embodiment.

The embodiments described so far were mainly related to a communication from the transmitter, like the base station, to a plurality of UEs, e.g., the DL communication. However, the present invention is not limited to DL communications, rather, the inventive approach may also be applied in the communication, e.g., the UL communication, from a plurality of UEs to one or more receivers, like a base station. For example, when considering FIG. 8, the base station 300, which serves the plurality of UEs 302, 304 or even more UEs, receives on the resources, which are shared by the plurality of UEs 302, 304, the superimposed signal 306, The superimposed signal 306 includes at least a first data signal of the UE 302 and a second data signal of the second UE 304. The first data signal and the second data signal are modulated by the respective UEs 302, 304 differently using different waveforms and are transmitted from the UEs using a non-orthogonal multiple access, NOMA, scheme, thereby creating at the base station 300 the superimposed signal 306. FIG. 9 is a block diagram illustrating the inventive uplink multi-user superposition transmission scheme in accordance with an embodiment. For example, the signal processor 300*a* of the base station 300 may include or implement a separation block 320, demodulators 322$_1$, 322$_2$ and decoders 324$_1$,324$_2$. The separation block 320 receives and processes the received superimposed signal 306 to obtain the first data signal and the second data signal. The first data signal and the second data signal are applied to respective demodulators 322$_1$, 322$_2$, which demodulate the first data signal and the second data signal on the basis of the waveforms $WF_1$, $WF_2$ used for modulating the first data signal and the second data signals at the respective UEs. The demodulated signals may be applied to respective decoders 324$_1$,324 to obtain the data 308*a* and 308*b* of the UE 302 and of the UE 304. The separation block 320 may process the received superimposed signal 306 on the basis of the waveforms $WF_1$, $WF_2$ used for modulating the first data signal and the second data signals. The base station 300 may receive information indicating the respective waveforms $WF_1$, $WF_2$ used for modulating the first data signal and the second data signal, and indication the non-orthogonal multiple access, NOMA, scheme. This information may be provided to the separation block 320 and to the demodulators 322$_1$, 322$_2$, as is indicated schematically in FIG. 9.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 10:
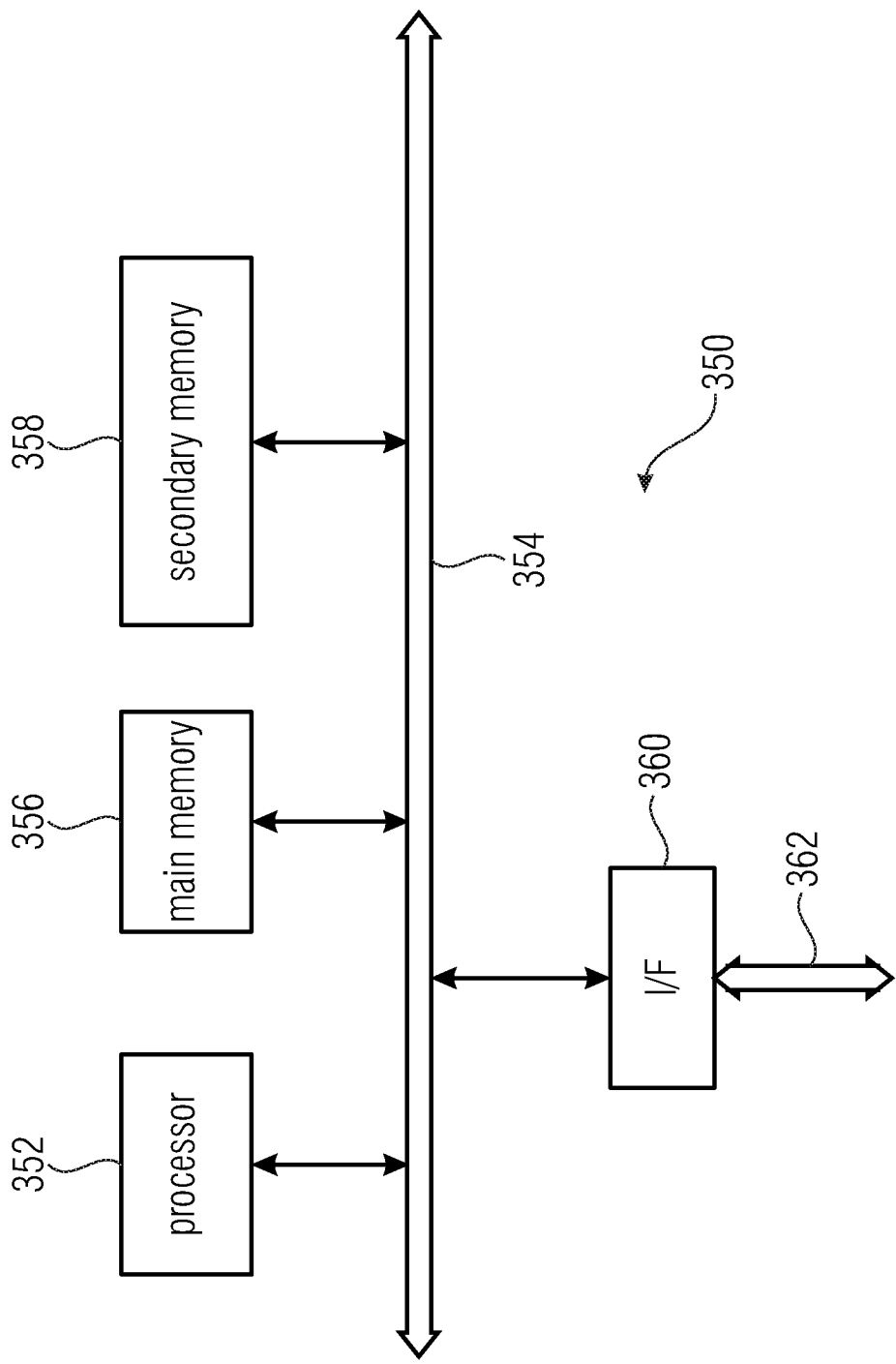
FIG. 10 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 36.859 v13.0.0 (2015-12)

The invention claimed is:

1. An apparatus for serving a plurality of user equipments in a wireless communication system,
wherein, for transmitting data of a plurality of user equipments, which comprise at least a first user equipment and a second user equipment, on resources shared by the plurality of user equipments, the apparatus is configured to:
modulate the first data signal and the second data signal using different waveforms prior to superimposing the first and second data signals, the first data signal of the first user equipment being modulated using a first waveform, and the second data signal of the second user equipment being modulated a second waveform, the first waveform being different from the second waveform;
process the first data signal and the second data signal according to
a pathloss or signal attenuation on first and second channels between the first and second user equipments and the apparatus, or a geographical location of the first user equipment relative to the apparatus and the geographical location of the second user equipment relative to the apparatus;
superimpose the first data signal and the second data signal;
select the first and second waveforms for modulating the first data signal and the second data signal dependent on channel properties of the first and second channels between the first and second user equipments and the apparatus; and
signal to the first user equipment the first waveform used for the modulation of the first data signal and the second waveform used for the modulation of the second data signal, and signal to the second user equipment only the second waveform used for the modulation of the second data signal, and
wherein the first user equipment is closer to the apparatus than the second user equipment or has a pathloss or signal attenuation on the first channel between the first user equipment and the apparatus less than a pathloss or signal attenuation on the second channel between the second user equipment and the apparatus.

2. The apparatus of claim 1, wherein, for processing the first data signal and the second data signal, the apparatus is configured to:
allocate a first power level to the first data signal and a second power level to the second data signal, the first power level being different from the second power level;
apply a first spreading sequence to the first data signal and a second spreading sequence to the second data signal, the first spreading sequence being different from the second spreading sequence.

3. The apparatus of claim 1, wherein the apparatus is configured to;
determine a first property of the first channel between the apparatus and the first user equipment;
determine a second property of the second channel between the apparatus and the second user equipment; and
select the first waveform and the second waveform dependent on the the first and second channel properties.

4. The apparatus of claim 1, wherein the first waveform and the second waveform comprise:
an OFDM (Orthogonal Frequency-Division Multiplexing) waveform,
a CP-OFDM (cyclic pre-fix based OFDM) waveform with normal CP size,
a CP-OFDM (cyclic pre-fix based OFDM) waveform with extended CP size,
a DFT-s-OFDM (Discrete Fourier Transform-spread-OFDM) waveform with CP
a f-OFDM (Filtered OFDM) waveform,
a FBMC (Filter Bank Multi-Carrier) waveform,
a GFDM (Generalized Frequency Division Multiplexing) waveform, or
an UFMC (Universal Filtered Multi-Carrier) waveform.

5. The apparatus of claim 1, wherein the apparatus is configured to:
determine that
the pathloss or signal attenuation on the first channel between the first user equipment and the apparatus is less than the pathloss or signal attenuation on the second channel between the second user equipment and the apparatus; or
the first user equipment is closer to the apparatus than the second user equipment.

6. The apparatus of claim 1, wherein the apparatus is configured to:
provide a data frame comprising the superimposed signal;
provide a pilot frame comprising pilot signals to be used by the first user equipment and the second user equipment for channel estimation and/or synchronization; and
transmit the pilot frame comprising the pilot signals and the data frame comprising the superimposed signal.

7. The apparatus of claim 6, wherein the apparatus is configured to provide the pilot signals using a third waveform, the third waveform being different from the first waveform and from the second waveform, or the third waveform being the same as one of the first and second waveforms.

8. The apparatus of claim 6, wherein the apparatus is configured to transmit the pilot frame with a certain periodicity, the periodicity being selected dependent on one or more predefined criteria.

9. The apparatus of claim 6, wherein the apparatus is configured to:
estimate a mobility of the first user equipment and the second user equipment;
transmit the pilot frame once at the beginning of a transmission in case the first user equipment and the second user equipment comprise no mobility;
transmit the pilot frame periodically in case the first user equipment and the second user equipment comprise a mobility below a predefined threshold, the periodicity chosen from a list of periods according to estimated channel conditions; and
transmit the pilot frame together with each data frame in case the first user equipment and the second user equipment comprise a mobility above the predefined threshold.

10. The apparatus of claim 6, wherein
the pilot frame is used for channel estimation of the first and second channels between the apparatus and the first and second user equipments, and
the apparatus is configured to transmit, at least once during a transmission, a synchronization signal block comprising synchronizations signals for the synchronization.

11. The apparatus of claim 8, wherein the apparatus is configured to signal to the first user equipment and to the second user equipment the periodicity of the pilot frame, and the waveform(s) used for the modulation of the pilot signals and/or the synchronization signals.

12. The apparatus of claim 1, wherein the apparatus is configured to:
provide a frame comprising the superimposed signal;
embed in the frame pilot signals to be used by the first user equipment and the second user equipment for channel estimation and/or synchronization; and
transmit the frame comprising the superimposed signal and the pilot signals.

13. A method for transmitting in a wireless communication system data of a plurality of user equipments, which comprise at least a first user equipment and a second user equipment, on resources shared by the plurality of user equipments, the method comprising:
modulating the first data signal and the second data signal using different waveforms prior to superimposing the first and second data signals, the first data signal of the first user equipment being modulated using a first waveform, and the second data signal of the second user equipment being modulated a second waveform, the first waveform being different from the second waveform;
processing the modulated first data signal and the modulated second data signal according to
a pathloss or signal attenuation on first and second channels between the first and second user equipments and the apparatus, or a geographical location of the first user equipment relative to the apparatus and the geographical location of the second user equipment relative to the apparatus;
superimposing the first data signal and the second data signal;
selecting the first and second waveforms for modulating the first data signal and the second data signal dependent on channel properties of the first and second channels between the first and second user equipments and the apparatus; and
signaling to the first user equipment the first waveform used for the modulation of the first data signal and the second waveform used for the modulation of the second data signal, and signal to the second user equipment only the second waveform used for the modulation of the second data signal, and
wherein the first user equipment is closer to the apparatus than the second user equipment or has a pathloss or signal attenuation on the first channel between the first user equipment and the apparatus less than a pathloss or signal attenuation on the second channel between the second user equipment and the apparatus.

14. A apparatus for serving a plurality of user equipments in a wireless communication system, wherein, for transmitting data of a plurality of user equipments, which comprise at least a first user equipment and a second user equipment, on resources shared by the plurality of user equipments, the apparatus is configured to
modulate the first data signal and the second data signal using different waveforms prior to superimposing the first and second data signals;
process the first data signal and the second data signal according to
a pathloss or signal attenuation on first and second channels between the first and second user equipments and the apparatus, or
a geographical location of the first user equipment relative to the apparatus and the geographical location of the second user equipment relative to the apparatus;
superimpose the first data signal and the second data signal;
provide a data frame comprising the superimposed signal;
provide a pilot frame comprising pilot signals to be used by the first user equipment and the second user equipment for channel estimation and/or synchronization;
transmit the pilot frame comprising the pilot signals and the data frame comprising the superimposed signal;
estimate a mobility of the first user equipment and the second user equipment;

transmit the pilot frame once at the beginning of a transmission in case the first user equipment and the second user equipment comprise no mobility;

transmit the pilot frame periodically in case the first user equipment and the second user equipment comprise a mobility below a predefined threshold, the periodicity chosen from a list of periods according to estimated channel conditions; and transmit the pilot frame together with each data frame in case the first user equipment and the second user equipment comprise a mobility above the predefined threshold.

* * * * *

UNITED STATES PATENT AND TRADEMARK OFFICE
CERTIFICATE OF CORRECTION

| | |
|---|---|
| PATENT NO. | : 11,659,525 B2 |
| APPLICATION NO. | : 16/994252 |
| DATED | : May 23, 2023 |
| INVENTOR(S) | : Sameh Eldessoki et al. |

It is certified that error appears in the above-identified patent and that said Letters Patent is hereby corrected as shown below:

In the Claims

1. In Claim 2, Column 28, Line 39, delete "level" and insert --level; or--
2. In Claim 3, Column 28, Line 52, delete the repetition of "the"
3. In Claim 10, Column 29, Line 53, delete "comprising syncrhonizations signals" and insert --comprising synchronization signals--

Signed and Sealed this
Nineteenth Day of September, 2023

Katherine Kelly Vidal
*Director of the United States Patent and Trademark Office*